United States Patent
Matsushita

[11] Patent Number: 6,070,018
[45] Date of Patent: May 30, 2000

[54] CAMERA WITH COLOR DATA DISPLAY

[75] Inventor: Tsuyako Matsushita, Kawagawa-ken, Japan

[73] Assignee: Nikon Corporation, Tokyo, Japan

[21] Appl. No.: 08/926,031

[22] Filed: Sep. 9, 1997

Related U.S. Application Data

[63] Continuation-in-part of application No. 08/627,995, Apr. 4, 1996, abandoned, and application No. 08/668,742, Jun. 24, 1996, abandoned, which is a continuation-in-part of application No. 08/627,995.

[30] Foreign Application Priority Data

| Apr. 7, 1995 | [JP] | Japan | 7-082215 |
| Apr. 7, 1995 | [JP] | Japan | 7-082713 |
| Jun. 22, 1995 | [JP] | Japan | 7-155754 |

[51] Int. Cl.[7] .............. G03B 7/08; G03B 17/18
[52] U.S. Cl. .......................... 396/225; 396/292
[58] Field of Search ................... 396/225, 292, 396/287, 209; 356/404, 222, 402, 218; 348/223, 227; 250/226

[56] References Cited

U.S. PATENT DOCUMENTS

| 4,389,118 | 6/1983 | Yuasa et al. | 356/404 |
| 4,601,571 | 7/1986 | Yuasa et al. | 356/404 X |
| 4,847,651 | 7/1989 | Izumi et al. | 396/292 |
| 4,847,680 | 9/1989 | Okino | 433/37 |
| 4,887,121 | 12/1989 | Pritchard | 396/225 |
| 4,918,470 | 4/1990 | Whiteside | 396/209 |
| 4,951,134 | 8/1990 | Nakasima et al. | 348/223 X |
| 5,048,955 | 9/1991 | Bernhard | 356/218 X |
| 5,109,248 | 4/1992 | Petrakos et al. | 396/155 |
| 5,172,146 | 12/1992 | Woolridge | 396/209 |
| 5,218,399 | 6/1993 | Izumi et al. | 396/292 |
| 5,298,935 | 3/1994 | Nagata | 396/225 |
| 5,424,798 | 6/1995 | Takagi | 396/275 |
| 5,452,049 | 9/1995 | Takagi | 396/225 X |
| 5,649,244 | 7/1997 | Sato et al. | 396/292 X |
| 5,660,075 | 8/1997 | Hashimoto et al. | 348/227 |

FOREIGN PATENT DOCUMENTS

| 6-242487 | 9/1994 | Japan . |
| 6-258694 | 9/1994 | Japan . |

*Primary Examiner*—W. B. Perkey
*Attorney, Agent, or Firm*—Oliff & Berridge, PLC

[57] ABSTRACT

A camera is provided in which light entering from an object field through a shooting lens is reflected by reflective mirror, and an image is formed on a focusing screen. The light that forms the image is reflected in a pentaprism, and forms an image on an eyepiece lens. Photometry is performed on each light component of the light that left from the pentaprism through the photometry lens by a photometry element and color information from the photometry value is computed in a CPU. Looking through a finder the color information is displayed, having been computed by the CPU at a color information display apparatus. A user can see the display in the finder through the eyepiece lens. Also, a camera wherein when a photographer either presses a release button half way down or all the way down, the CPU performs an exposure calculation and calculates the aperture value and the shutter speed for appropriate exposure. It then detects the status of a selector dial and performs various calculations and displays various information, including shutter speed, exposure revision value, ISO sensitivity, CC factor, LB factor, color temperature, in multiple component displays according to the mode selected. Further, apparatus, e.g., a camera, a colorimeter, etc. enables simultaneous display of various color information for various types of photosensitive materials.

24 Claims, 28 Drawing Sheets

| STATUS OF THE SELECTOR DIAL | FINDER DISPLAY COMPONENT 9 | DISPLAY COMPONENT 10 | DISPLAY COMPONENT 11 |
|---|---|---|---|
| SELECTION OF THE COLOR INFORMATION DISPLAY | COLOR TEMPERATURE | LB FACTOR | CC FACTOR |
| SELECTION OR THE DISPLAY OF OTHER THAN THE COLOR INFORMATION | SHUTTER SPEED | SHUTTER SPEED AND EXPOSURE REVISION VALUE | FILM ISO SENSITIVITY |

CAMERA WITH COLOR DATA DISPLAY

This application is a Continuation-In-Part of U.S. patent application Ser. No. 08/668,742, filed on Jun. 24, 1996 which is a Continuation-In-part of U.S. patent application Ser. No. 08/627,995 filed on Apr. 4, 1996, both abandoned. This application is also a Continuation-In-Part of U.S. patent application Ser. No. 08/627,995.

BACKGROUND OF THE INVENTION

1. Field of the Invention

The invention relates to a camera which photographs an object field, and relates in particular to a camera with improved operability. It further relates to a camera that has the ability to display color information including color temperature and so forth of the object field. The invention further relates to a display apparatus for displaying color information in a camera and a colorimeter for measuring color information in order to take a picture of the object field with the appropriate color balance.

2. Description of Related Art

In color photography a revision use color filter for correction use is mounted to a camera in order to photograph an object field with a suitable color balance. The user uses a colorimeter and the colorimeter performs photometry on the color balance of entering light. The user then chooses a prescribed color filter from the color information obtained, including object field color temperature, light balancing factors, color compensating factors for photographing the object field with appropriate color balance and filter names corresponding to light balancing factors and color compensating factors, all of which allow the user to select the proper color filter.

However, it has previously been necessary to carry the colorimeter apart from the camera, in order to select a color filter for correction use.

Further, color film is made so as to maintain balance between each color component Y (yellow), M (magenta) and C (Cyan) when the appropriate exposure is provided for a light source below a designated color temperature. However, because the photographer will not always perform photography beneath the designated color temperature, the color balance is such that it can be adjusted by the filter which is attached to a front of the photographic lens.

With these types of filters, a light balancing filter (hereinafter referred to as LB filter), which converts the color temperature of the incident light of the camera to the color temperature which is appropriate for the type of film used, and a color compensating filter (hereinafter referred to as a CC filter), which performs adjustment of the color balance, are generally widely used. LB filters are provided in multiple types according to each photo-sensitive material, and CC filters are also provided as multiple types according to the photographic condition.

Because the camera of the prior art was not equipped with a function to measure the color temperature of the object field, the color temperature of the camera surroundings was measured by way of a colorimeter which was separate from the camera, and the most appropriate filter was selected according to the measurement result. For this reason, it was a very cumbersome process because one must always carry a colorimeter, and there was the fear that one might miss a rare shutter opportunity because photography preparation takes time.

In Japanese laid-open patent publication no. 6-242487 and Japanese laid-open patent publication no. 6-258694, a camera which provides a meter for color temperature is described. The camera described in these patents measures the color temperature based on the amount of light which the photometry element receives, and then displays the measurement result to the display device which is arranged on the top of the camera.

However, the camera described in the aforementioned 6-242487 displays only the color temperature, and does not provide the means to notify the photographer of the most appropriate filter for the displayed color temperature. For this reason, it was necessary for the photographer to select the filter himself according to the displayed color temperature. Additionally, in 6-258694, a camera which displays the filter name is described. However, in 6-258694, only the filter name is displayed, and the color temperature in not displayed. For this reason, the photographer is resigned to use only the filter which is displayed, and is unable to select a filter when desiring to obtain a photo of his preferred color.

Further, there are two types of films, a day light type film and a tungsten type film, each of which has different spectrum sensitivity characteristics. A day light type film is designed to produce the best color with a light source having a color temperature of about 5,500 K, while a tungsten type film is designed to produce the best color with a light source having a color temperature of about 3,200 K. Therefore, it is best to select a color filter corresponding to types of film having different color sensitivity.

A film type interchanging switch is provided for a colorimeter of the prior art and is used to select an appropriate color filter. Depending on the position of the film type interchanging switch, a different light balancing factor is obtained for each type of film (day light type or tungsten type). Hence, it became necessary to provide a filter type interchanging switch when the user desires to obtain a light balancing factor for both film types.

SUMMARY OF THE INVENTION

Considering the above circumstances, it is an objective of the invention to be able to select color filters for correction use by operation of the camera.

It is a further object of the invention to provide a camera which has the ability to display color information to allow the comprehension of detailed color information in the camera body without the use of a colorimeter or so forth, and to display the multiple color information each to differing display components of the camera.

It is a further objective of the invention to make it possible to simultaneously discern the light balancing factor of different types of film and select simply and speedily the correction color filter using an existing display unit without providing a film type interchanging switch.

A camera according to a first embodiment of the invention comprises a photometry device which accomplishes photometry separation of all multiple color elements of light entering from the object field, a calculation device which computes the object field color information (color temperature, light balancing factor, color compensating factor) for photographing the object field with suitable color balance using photometric values from the photometry accomplished by the light photometry device, and a display device which simultaneously displays the multiple color information of the object field.

The camera selection means is further provided with a selection device to select a first display mode, wherein the display device simultaneously displays the multiple color information, or a second display mode, wherein the display device displays the multiple filter names corresponding to the multiple color information.

In the camera of the first embodiment, an exposure calculation device can be provided to measure an amount of light from the object field and to compute proper exposure values from the measurement results, and moreover, the selection device is made to select a third display mode in which the display device displays the diaphragm value and the shutter speed which are proper exposure values as computed by the exposure calculation device.

In the display device, a prescribed display execution can be created within the finder.

In the display device, a prescribed display execution can be created on the outside of the camera body.

In the camera according to the first embodiment of the invention, in the case where the display switching dial switches to a first mode or a second mode, the photometry element accomplishes photometry on all color elements of the light entering from the object field by means of half depressing the release button. The photometry value(s) determined by the photometry are input to a computer processing unit (CPU). The CPU uses the photometry value (s) to compute the color information, and simultaneously displays the color information computed on a color information display apparatus. Therefore, a colorimeter becomes unnecessary, and operability improves.

According to a second embodiment of the invention, a camera comprises multiple display components that display each category of information which relates to the environment and which are each arranged in different locations, a photometry device that performs the photometry of the object field, a color information calculation device that calculates the multiple color information which relates to the environment based on the photometry results of the photometry device, and a display control device that controls display of the multiple color information at each of the different display components according to the multiple color information.

The camera of the second embodiment further comprises an exposure calculation device that calculates exposure information based on the photometry results of the photometry device and a selection device that selects either the color information or the exposure information for the display components whereby either the color information or the exposure information is displayed by at least one of the multiple display components. The invention further comprises a color information calculation device that calculates the multiple color information for only the case where the color information is selected by the selection device.

Further, the second embodiment of the invention is such that where a portion of the color information that is calculated by the color information calculation device is color information where the value differs due to the disparity of the photo-sensitive materials, the color information that has a differing value due to the disparity of the photo-sensitive materials is displayed to at least one of the multiple display components according to the type of photo-sensitive material.

Furthermore, the invention according to the second embodiment includes as the color information that has a differing value due to the disparity of the photo-sensitive materials at least the color information regarding the day light-type of film and the color information regarding the tungsten-type of film.

The second embodiment of the invention also comprises a color information calculation device that calculates the color temperature of the object field.

The camera of the second embodiment further comprises a color information calculation device that calculates the information relating to the light balancing filter which converts the color temperature of the incident light of the camera to the color temperature which is appropriate to the film used.

The invention according to the second embodiment also comprises a color information calculation device that calculates the information relating to the color compensating filter that performs the adjustment of the color balance.

Further, according to the second embodiment the display provides the display components are located within a finder of the camera and in at least one location on one of either a top of the camera or a back of the camera.

Furthermore, the color information that is calculated by the color information calculation device can be displayed at display components which are arranged on an external surface of the camera.

Additionally, the invention according to the second embodiment is such that where the multiple color information that is calculated by the color information calculation device is color temperature information of the object field and light balancing filter information that converts the color temperature of incident light of the camera to the color temperature that is appropriate for the type of film being used, it displays the color temperature information on the display component within the finder and displays the light balancing filter information on the display components that are on either the top of the camera or on the back of the camera.

According to the second embodiment of the invention, by displaying the multiple color information, which is calculated by the color information calculation means, to the differing display components according to the type of information, specific color information can be simultaneously understood.

Further, by providing the ability to select either display of exposure information or display of color information by the selection device, the color information calculation device calculates the multiple color information only where display of the color information is selected. Thus, the displays of the display components are easier to look at.

Furthermore, the color information that has differing value due to the disparity of the photo-sensitive materials is displayed to at least one of the multiple display components according to the type of photo-sensitive material. Also, the color information regarding the day light-type of film and the color information regarding the tungsten-type of film is displayed to at least one of the multiple display components. Because the color information of the object field is calculated and shown, the adjustment of the color temperature becomes easier.

Additionally, the information with regard to the light balancing filter is calculated so that the most appropriate light balancing filter can be selected. The information with regard to the color compensating filter is calculated so that the most appropriate color compensating filter can be selected.

By providing the display components within the finder and in at least one location of either on the top of the camera or on the back of the camera, the display components from the prior art can be utilized. The color information calculation device displays the calculated color information to the display components which are provided on the exterior of the camera.

Also, the light balancing filter information which converts the color temperature of the incident light of the camera into the color temperature which is appropriate for the type of film used, and the color temperature of the object field, are calculated. Also, it displays the light balancing filter information which is calculated on the display components on either the top of the camera or on the back of the camera, and it displays the color temperature information which is calculated on the display component within the finder.

According to a third embodiment of the invention, an apparatus includes: a photometry device that measures light incident from an object field by dividing the light into a plurality of color components; a controller that determines a plurality of color information, for example, color temperature, LB-value and CC-value, of the object field in order to photograph the object field at the appropriate color balance using the photometry values obtained by the photometry device, the color information being obtained for at least two types of photosensitive materials; and a display that simultaneously displays the plurality of color information. The two types of photosensitive materials may be, for example, a day light type film and a tungsten type film.

The apparatus according to the third embodiment may be a camera. The camera may further include an exposure determination device that measures an amount of light of the object field and that determines from a result of the measurement, the shutter speed and diaphragm value that constitute appropriate exposure values. Further, the camera may include a selection unit by which the user can select a first mode in which the display simultaneously displays the plurality of color information of the object field corresponding to the two types of photosensitive materials, a second mode in which the display simultaneously displays the plurality of correction filter names corresponding to the plurality of color information of the object field corresponding to the two types of photosensitive materials, and a third mode in which the display simultaneously displays the shutter speed and the diaphragm value. Additionally, the display may be provided within a viewfinder of a camera. Alternatively, the display may be provided outside of the camera body.

Alternatively, the apparatus according to the third embodiment may be a colorimeter. The colorimeter may further include a selection unit by which the user can select a first mode in which the display simultaneously displays the plurality of color information of the object field corresponding to the two types of photosensitive materials, and a second mode in which the display simultaneously displays the plurality of correction filter names corresponding to the plurality of color information of the object field corresponding to the two types of photosensitive materials.

In the apparatus (camera, colorimeter, etc.) according to the third embodiments of the invention, the photometry device measures light by dividing the light rays entering from the object field into a plurality of color components, the controller determines color information corresponding to two types of photosensitive materials using the results of photometry performed by the photometry device, and the color information display simultaneously displays color information corresponding to two types of photosensitive materials. Hence, the user may discern color information corresponding to different types of photosensitive material simultaneously.

BRIEF DESCRIPTION OF THE DRAWINGS

The invention will be described with reference to the figures in which.

DETAILED DESCRIPTION OF PREFERRED EMBODIMENTS

Figure 1:
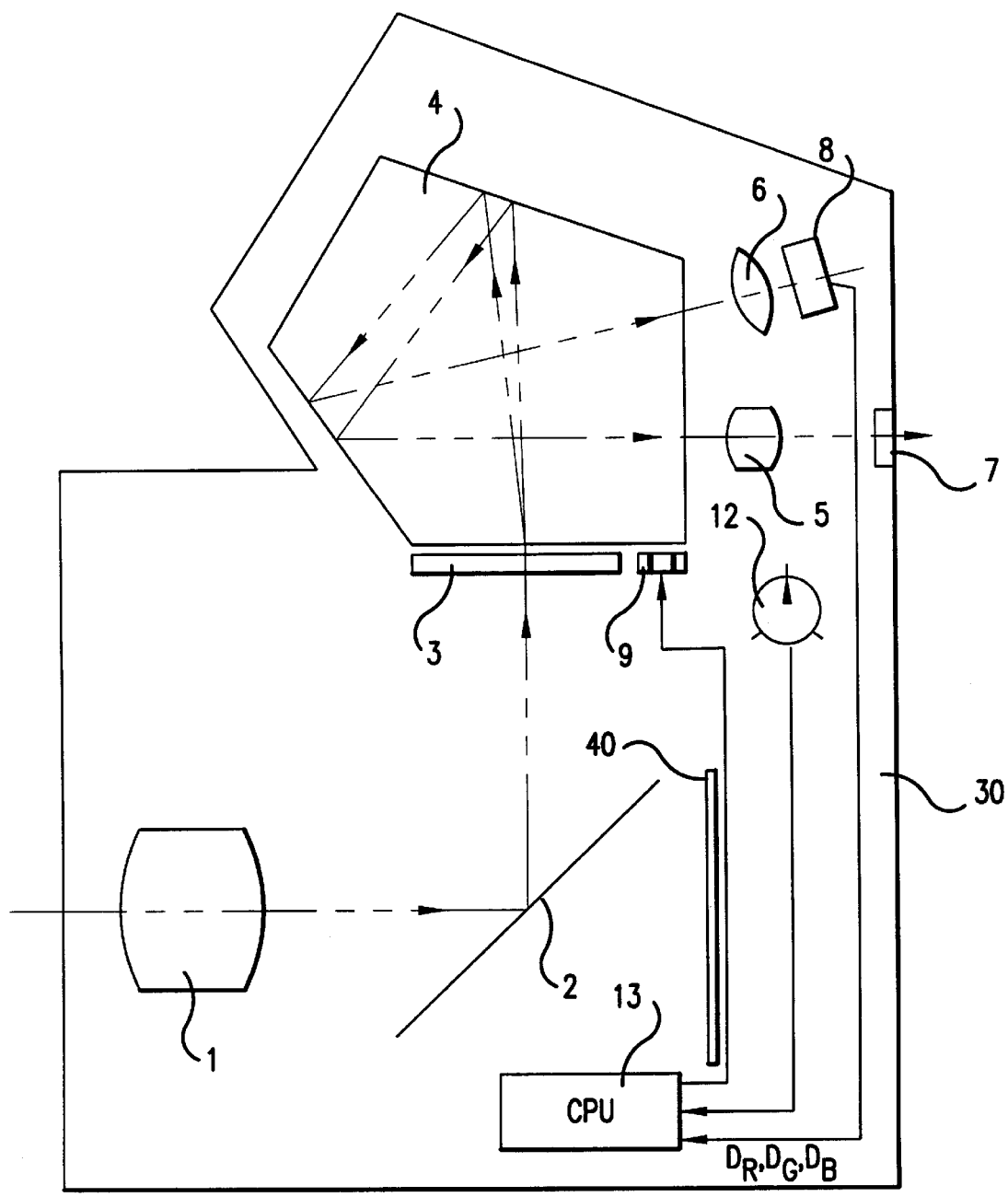
FIG. 1 is a schematic side view of a camera according to a first embodiment of the invention.

While the present invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

FIG. 1 shows an example of the structure of the camera according to a first embodiment of the invention. Shooting lens 1 causes the light of the object field to enter. Reflective mirror 2 causes the light which entered to reflect to focusing screen 3. The reflected light forms an image on focusing screen 3. Pentaprism 4 reflects the light that forms the image on focusing screen 3 to form the image on eyepiece lens 5. The user can verify the object field where the image is formed on focusing screen 3 through eyepiece lens 5.

Photometry lens 6 directs light which has left pentaprism 4 into photometry element 8. Photometry element 8 performs photometry on all red, green and blue light components of the light. The photometry values of each color component are output to CPU 13. CPU 13 uses the photometry values input from photometry element 8 to compute the color temperature, the light balancing factor (called LB value hereafter) and the color compensating factor (called CC value hereafter), as the color information used to photograph the object field at an appropriate color balance.

Also, CPU 13 computes the diaphragm value and the shutter speed as appropriate exposure values using the photometry output which was input from the photometry element 8.

The color information display apparatus 9 displays the parameters which were computed in CPU 13, and is arranged in a position to be visible at a lower part of the image on focusing screen 3 when observed through eyepiece lens 5 which forms finder 7. Thus, a photographer can verify the parameters which are displayed in the color information apparatus 9 along with the object field, by means of the eyepiece lens 5 and finder 7.

Display switching dial 12 is shown inside the camera body 30 in FIG. 1, but is actually arranged outside the camera body 30. Display switching dial 12 is operated to switch display parameters displayed in the color information apparatus 9 which consist of a first display mode (CM1), which simultaneously displays the color temperature, the LB value and the CC value, a second display mode (CM2), which simultaneously displays the LB filter names corresponding to the LB value and the CC filter names corresponding to the CC value, or a third display mode (EXP) which simultaneously displays the diaphragm value and the shutter speed. CPU 13 executes the computations corresponding to the mode selected using switching dial 12. Also, the object field is photographed on film 40.

Figure 2:
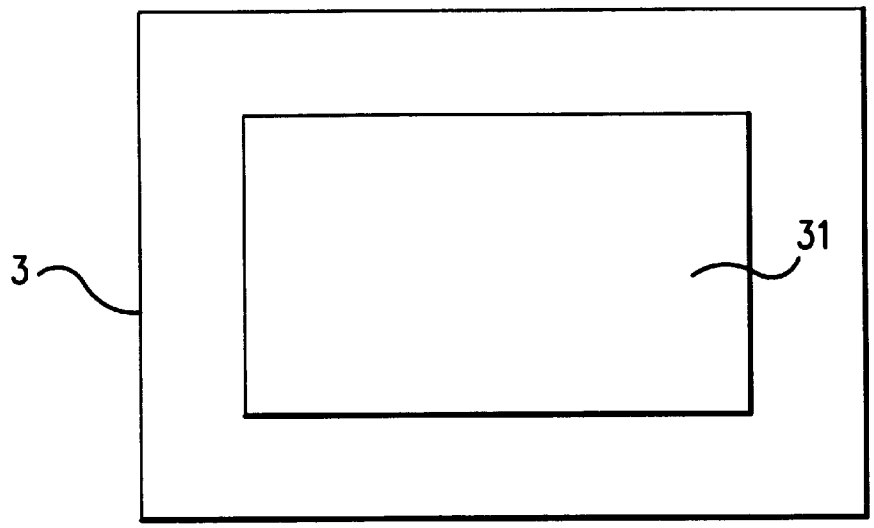
FIG. 2 is an example of the focusing screen 3 of FIG. 1.

FIG. 2 shows an example of focusing screen 3. The object field light reflected by reflective mirror 2 of FIG. 1 forms an image on focusing screen 3 shown in FIG. 2. Photometry is performed by photometry element 8 of FIG. 1 on the image formed inside the central photometry region 31 of the focusing screen 3. However, the range of photometry of the photometry process may differ from that shown in FIG. 2.

Figure 3:
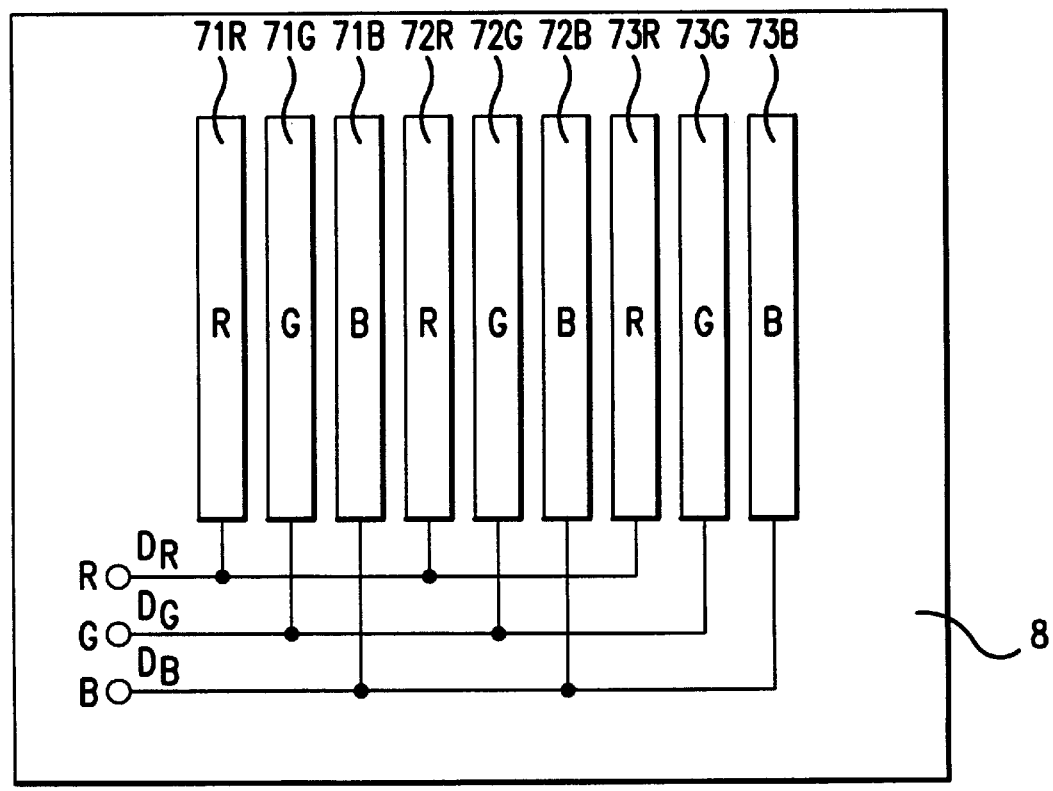
FIG. 3 is an example of the structure of the photometry element of FIG. 1.

FIG. 3 shows an example of the structure of photometry element 8 of FIG. 1. The photometry element 8 is formed of one chip type color sensor that uses stripe filters. The color filter is attached to the front face of the light sensor composed of nine short strips. In short, it is structured to have R (red) color filters attached at light sensors 71R, 72R, 73R, G (green) color filters attached at light sensors 71G, 72G, 73G, and B (blue) color filters attached at light sensors 71B, 72B, 73B, respectively.

By so doing, the respective photometry values of R (red) components in light sensors 71R–73R, the photometry values of G (green) components in 71G–73G, and the photometry values of B (blue) components in light sensors 71B–73B can be obtained. The photometry values of each of the color components are added, and sent to CPU 13 as R component sensor data $D_R$, G component of sensor data $D_G$, and B component sensor data $D_B$, respectively.

Furthermore, for simplicity, photometry element 8 is shown composed of the nine short strips having light sensors 71R–73R, 71G–73G, and 71B–73B, but in actuality, in order to take in the information of each color component of the entered light, it is divided into an extremely large number of parts. Also, photometry element 8 is arranged in a position wherein to a certain extent the focus is blurred. Uniform light is forced to irradiate the small strips of each light sensor 71R–73R, 71G–73G and 71B–73B.

Figure 4:
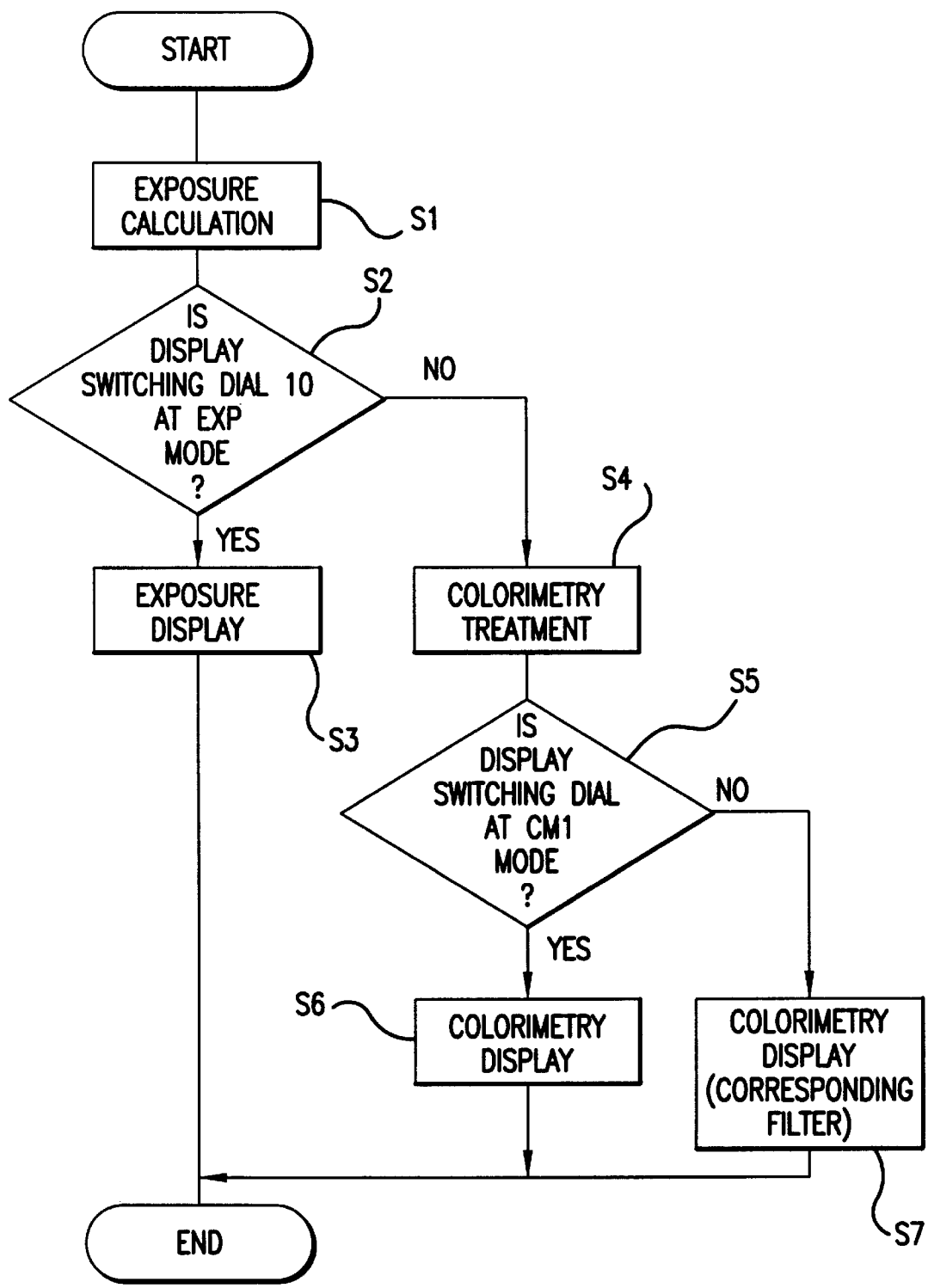
FIG. 4 is a flowchart that explains the functions of the first embodiment shown in FIG. 1.
Figure 5:
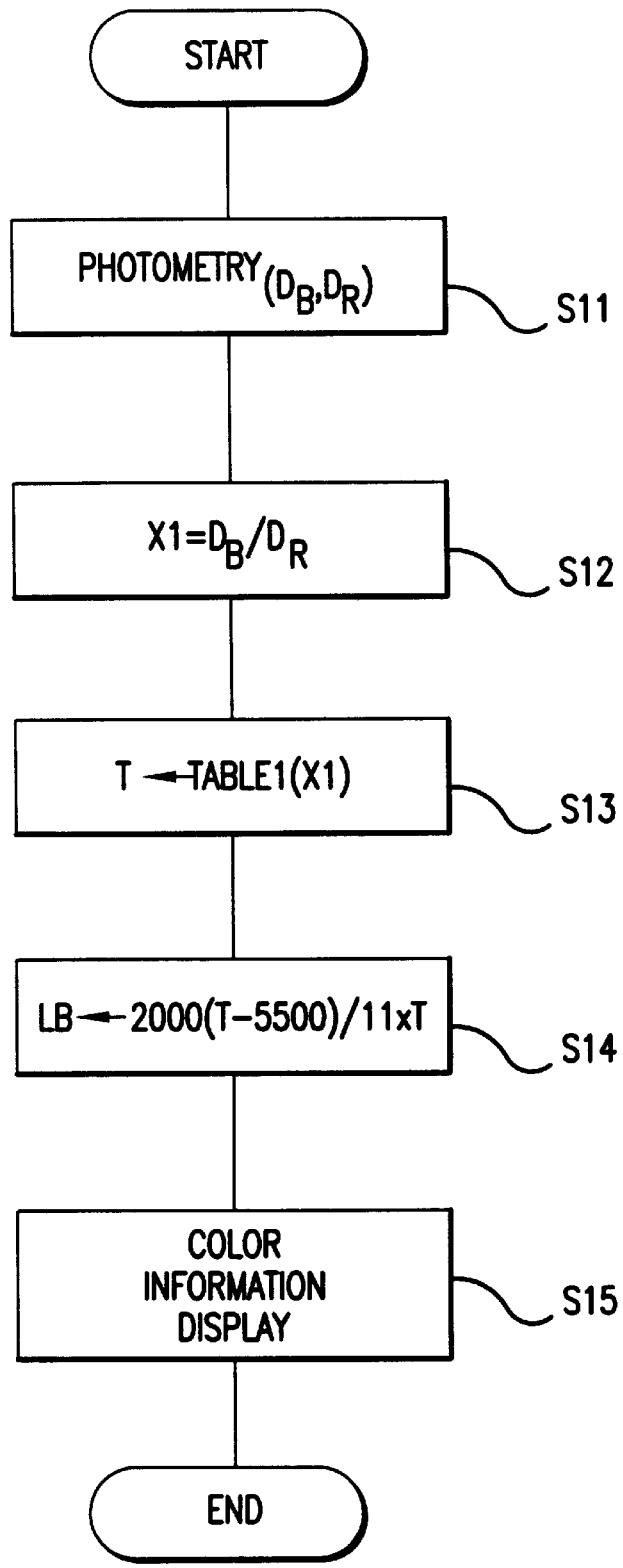
FIG. 5 is a flowchart that explains the steps of computing the color temperature and the LB value from among the colorimetry computations of step S5 of FIG. 4 according to the first embodiment of the invention.
Figure 6:
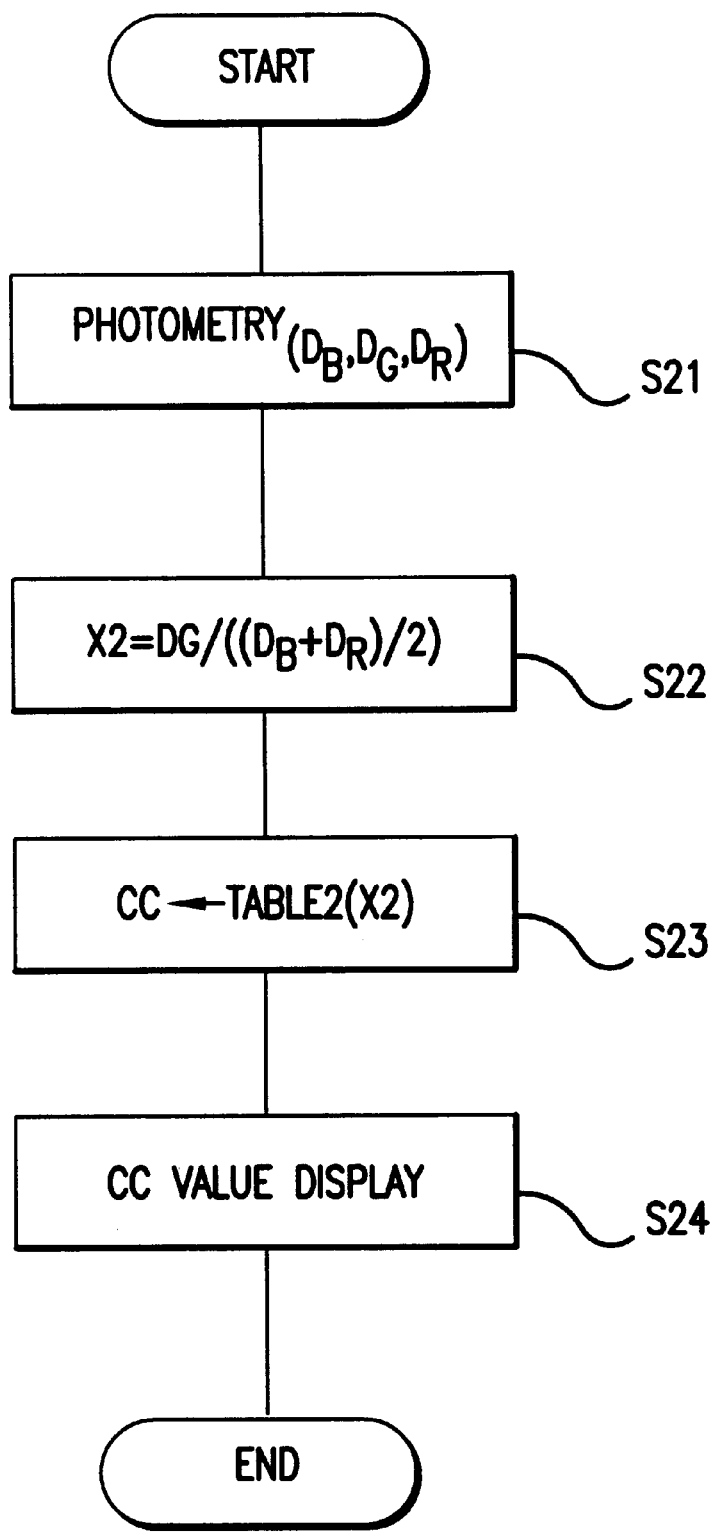
FIG. 6 is a flowchart that explains the steps of computing the CC value from among the colorimetry computations of step S5 of FIG. 4 according to the first embodiment of the invention.

The operation of the embodiment described in FIGS. 1–3 is explained hereafter, with reference to the flowcharts of FIGS. 4–6.

The light of the object field enters the camera through shooting lens 1. The light is reflected by reflective mirror 2, forming an image on focusing screen 3. Next, the light which formed the image is further reflected twice in pentaprism 4, and forms an image at eye piece lens 5. The user verifies the object field by observing the image formed.

The process of FIG. 4 starts when a time limit timer is activated by a half depression of a release button (not shown), or by starting the time limit timer which is activated by a half depression of the release button after a main switch (electric power switch) of the camera is turned on.

First, in step S1 photometry element 8 performs photometry on each color component red, green and blue, of the light from photometry lens 6 and outputs the photometry value (sensor data) of each of the color components to CPU 13, and then the program proceeds to step S2.

In step S2, CPU 13 determines whether display switching dial 12 is switched to the third mode (EXP), wherein the diaphragm value and shutter speed are displayed. If display switching dial 12 is determined to be switched to the third mode, the program moves to step S3.

In step S3, CPU 13 uses the photometry values input from photometry element 8 to compute the diaphragm value and shutter speed as proper exposure values of the object field and then CPU 13 causes the display of the diaphragm value and shutter speed at the prescribed position (to be explained later) of color information display apparatus 9, and the program is completed.

On the other hand, in step S2, when display switching dial 12 is determined to not be switched to the third mode (in other words, the switching dial is at the first or second mode), the program proceeds to step S4, and the CPU 13 executes the colorimetry computation shown in FIGS. 5 and 6.

FIG. 5 is a flowchart which shows the steps executed where CPU 13 computes the LB value and color temperature from the color information, from among the colorimetry computations of step S4 shown in FIG. 4. In step S11, CPU 13 reads in sensor data $D_R$ of the R components and sensor data $D_B$ of the B components from photometry element 8. In step S12, X1 (=$D_B/D_R$) is computed, which is the ratio of $D_B$ and $D_R$.

Next, in step S13, a predetermined table is used by CPU 13 to obtain the color temperature T (Kelvin) from the computed X1. Moreover, in step S14, the LB value (mired) from the color temperature T is computed using the following equation:

LB=2000×(T−5500)/(11×T)

FIG. 6 is a flowchart which shows the steps executed where CPU 13 computes the CC value from the color information out of the colorimetry computations of step S4 shown in FIG. 4. In step S21, CPU 13 reads in from photometry element 8, sensor data of B components $D_B$, sensor data of R components $D_R$, as well as sensor data from G components $D_G$. Next, in step S22, X2 is computed from the following equation:

X2=$D_G$/(($D_B$+$D_R$)/2)

Next, in step S23, the CPU 13 uses a predetermined table to obtain the CC value from the computed X2.

When the colorimetry computations of step S4, shown in FIGS. 5 and 6 are finished, the program proceeds to step S5.

In step S5, CPU 13 determines whether display switching dial 12 is switched to the first mode (CM1). If the display switching dial 12 is determined to be switched to the first mode, the program proceeds to step S6, and CPU 13 causes a simultaneous display of color temperature, LR value and CC value, at the prescribed position (to be explained later) of color information display apparatus 9, and the process is completed.

On the other hand, in step S5, when display switching dial 12 is determined to not be switched to the first mode (CM1) (in other words, it is switched to the second mode (CM2)), the program proceeds to step S7.

In step S7, CPU 13 causes simultaneous display of color temperature, the LB filter names corresponding to the computed LB value and CC filter names corresponding to the computed CC value, at the prescribed position (to be explained later) of color information display apparatus 9, and the process is completed.

Furthermore, the CPU 13 uses sensor data $D_R$, $D_G$, $D_B$ input from photometry element 8 in the exposure computations at step S1, for photometry by an appropriate ratio; and uses the computations of the color information stated above in the colorimetry computation of step S4 (in other words, when display switching dial 12 is switched to the first mode or second mode).

Figure 7:
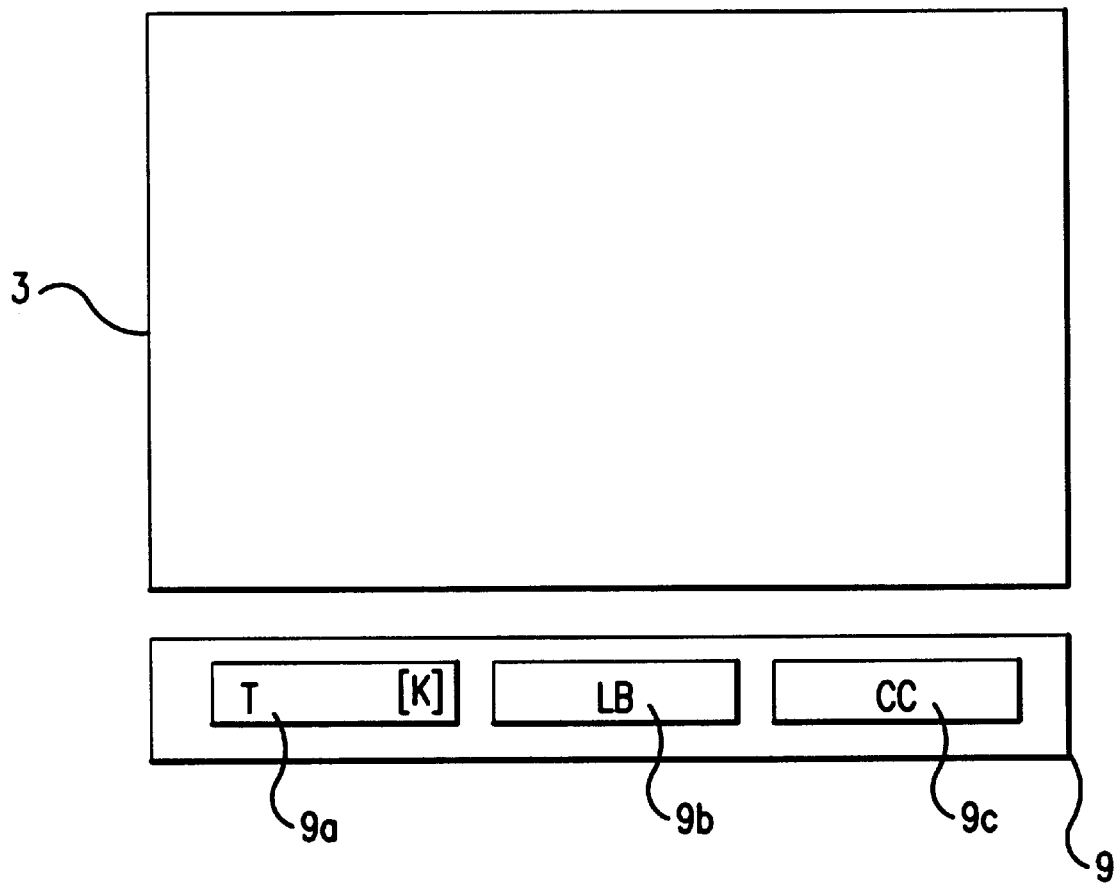
FIG. 7 shows an example of a display of the color information display apparatus and the focusing screen which can be seen through the eyepiece lens of FIG. 1.

FIG. 7 shows an example of the display of the color information display apparatus 9 and the focusing screen 3 the user can see inside the finder 7, through eyepiece lens 5 of FIG. 1. Inside finder 7, the color information display apparatus 9 is arranged at the lower part of the focusing screen 3. When display switching dial 12 is switched to the first mode (CM1), color temperature, LB value, and CC value are displayed in order from left to right in display units 9a, 9b, 9c respectively, of the color information display apparatus 9.

Further, it is possible to arrange color information display unit 9 outside camera body 30, rather than inside, to be visible elsewhere than inside finder 7.

Figure 8A:
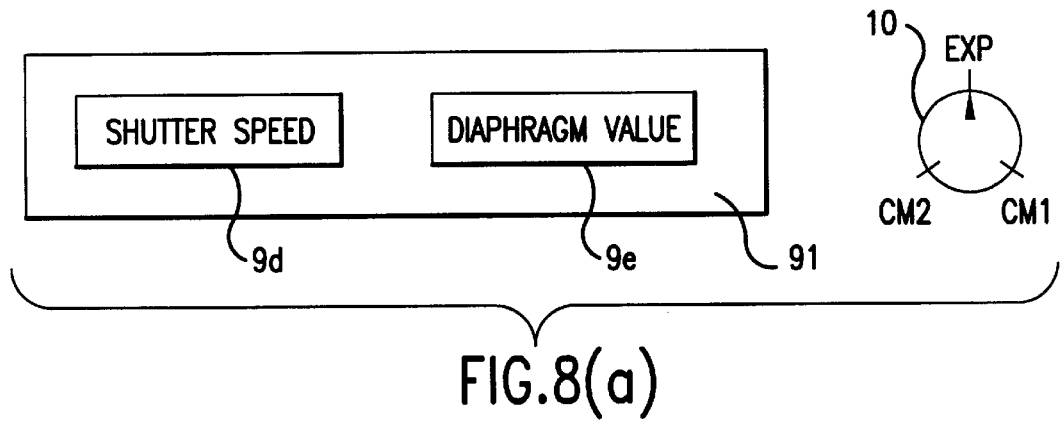
FIGS. 8(a)–8(c) show examples of a display of the color information display apparatus in each display mode of the display switching dial according to the first embodiment.
Figure 8B:
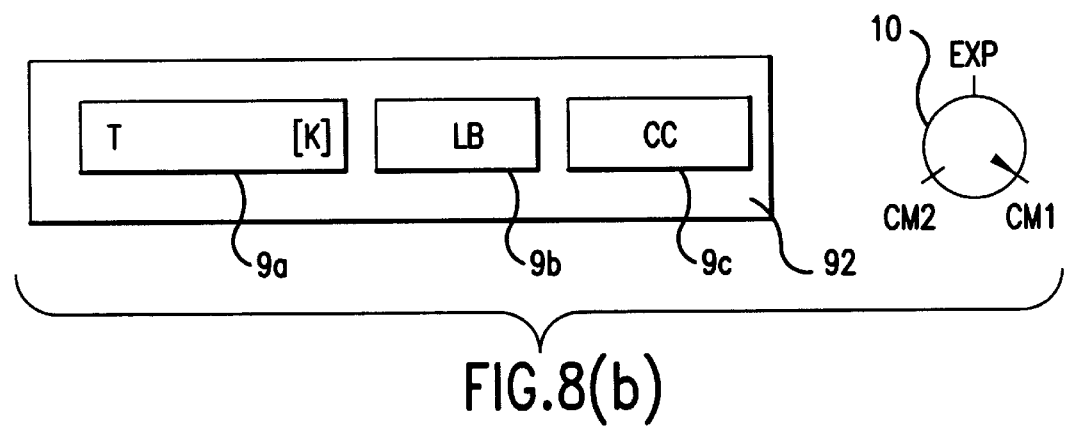
Figure 8C:
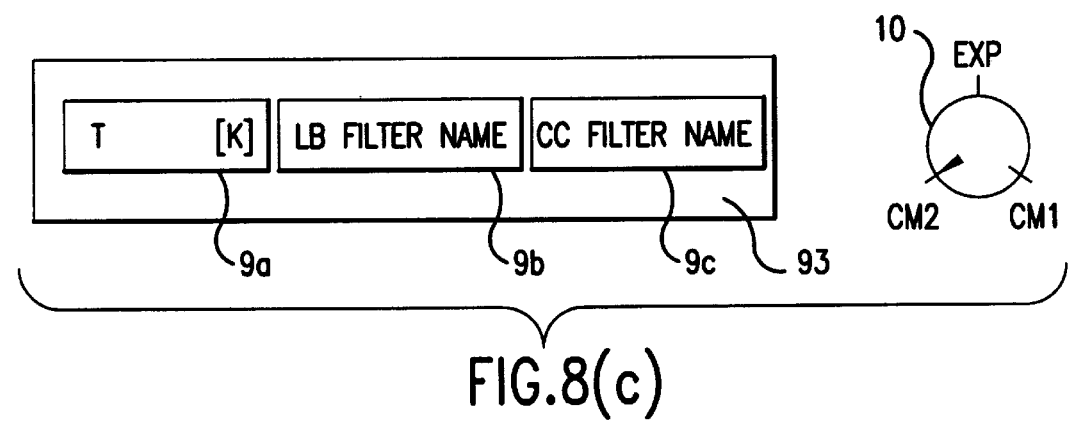

FIGS. 8(a)–8(c) show examples of the display of color information display apparatus 9 in each display mode of display switching dial 12. In the case that display switching dial 12 is switched to the first display mode (CM1), color information display apparatus 9 simultaneously displays color temperature T, LB value and CC value which are computed by CPU 13, as shown in FIG. 8(b). This display circumstance corresponds to the state shown in FIG. 7.

In the case where display switching dial 12 is switched to the second mode (CM2), color information display apparatus 9 simultaneously displays color temperature T, the LB filter names corresponding to the LB value and the CC filter names corresponding to CC value, as shown in FIG. 8(c).

In the case where display switching dial 12 is switched to the third display mode (EXP), color information display apparatus 9 simultaneously displays the shutter speed at display unit 9d and the diaphragm value at display unit 9e, as shown in FIG. 8(a).

Therefore, the user can obtain the desired color information by use of display switching dial 12, and even if the user wants to know the LB value and the CC value, it is not necessary to carry and operate a colorimeter.

As stated above, in a camera according to the first embodiment of the invention, the photometry device performs photometry on the color balance of the entering light, the calculation means computes the color information of the object field and, because the display device displays the color information and the filter names corresponding to the color information, it is not necessary to carry a colorimeter apart from the camera to select the filter for correction. Accordingly, operability is improved.

Next, the second embodiment of the camera which has the ability to display color information according to the invention, will be explained hereafter based on FIGS. 9–22.

Figure 9:
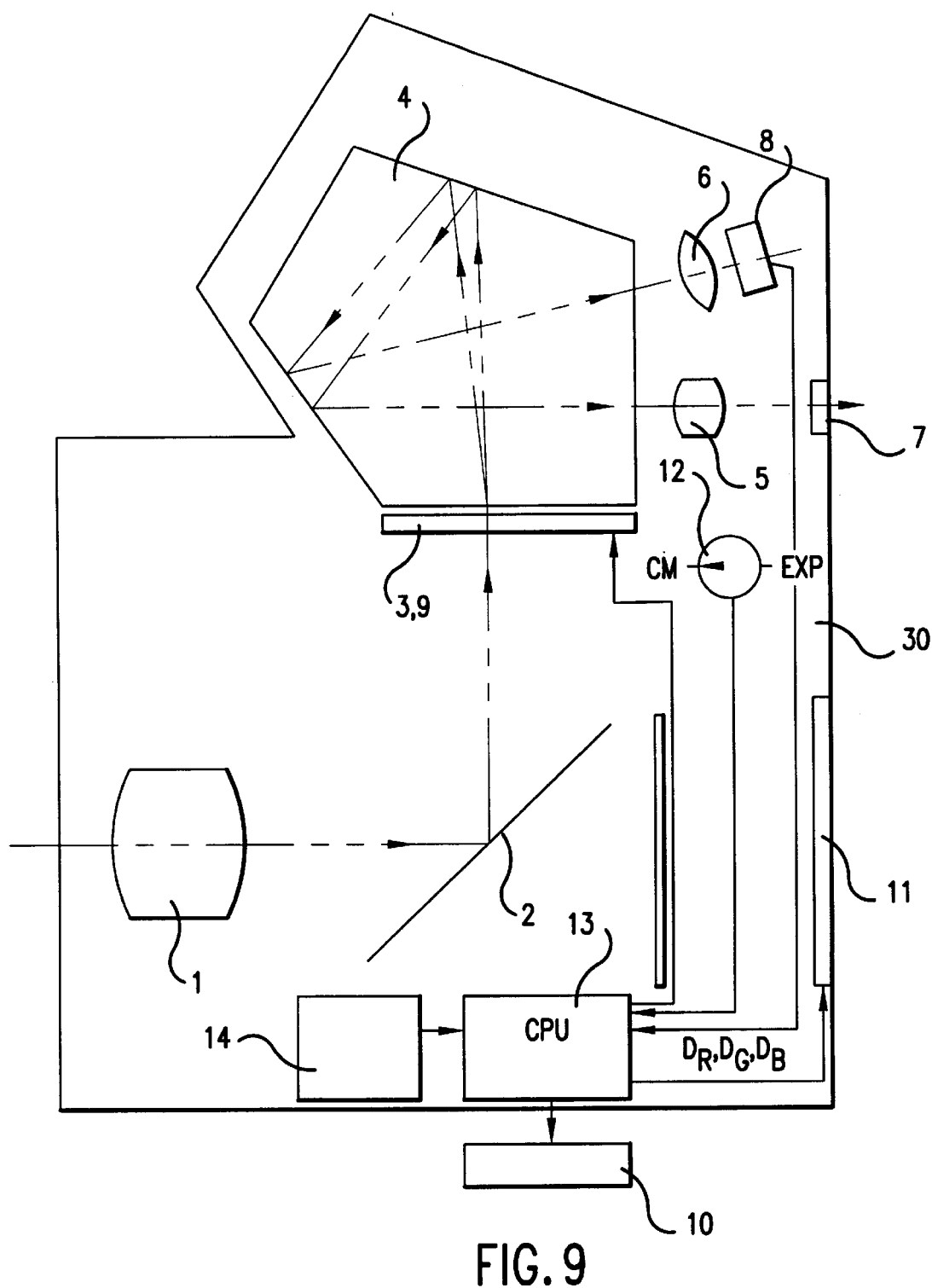
FIG. 9 is a schematic side view of a camera according to a second embodiment of the invention.
Figure 10:
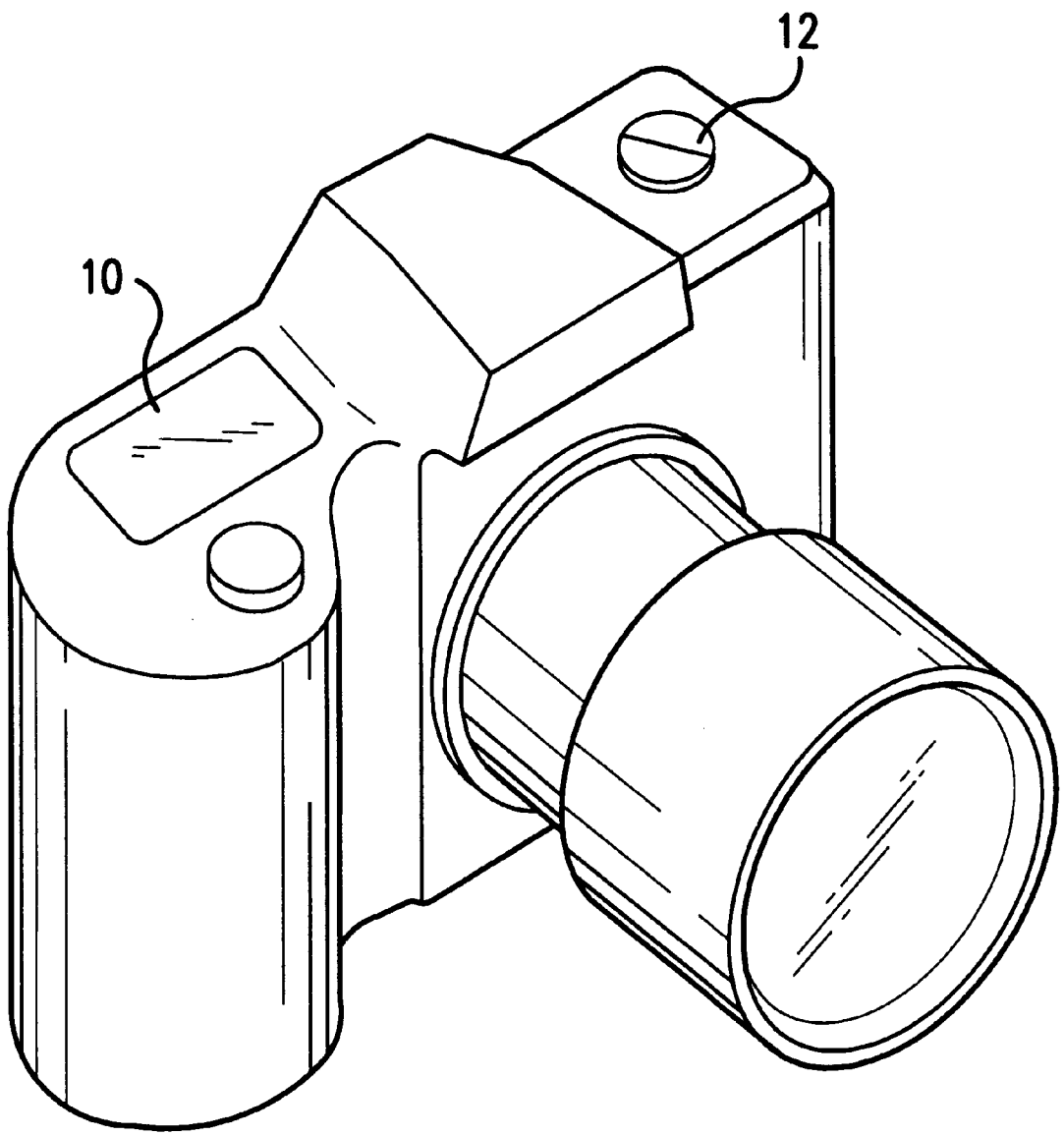
FIG. 10 is a front view of the camera of the invention as viewed from a diagonal direction from an upper left of a front side of the camera shown in FIG. 9.
Figure 11:
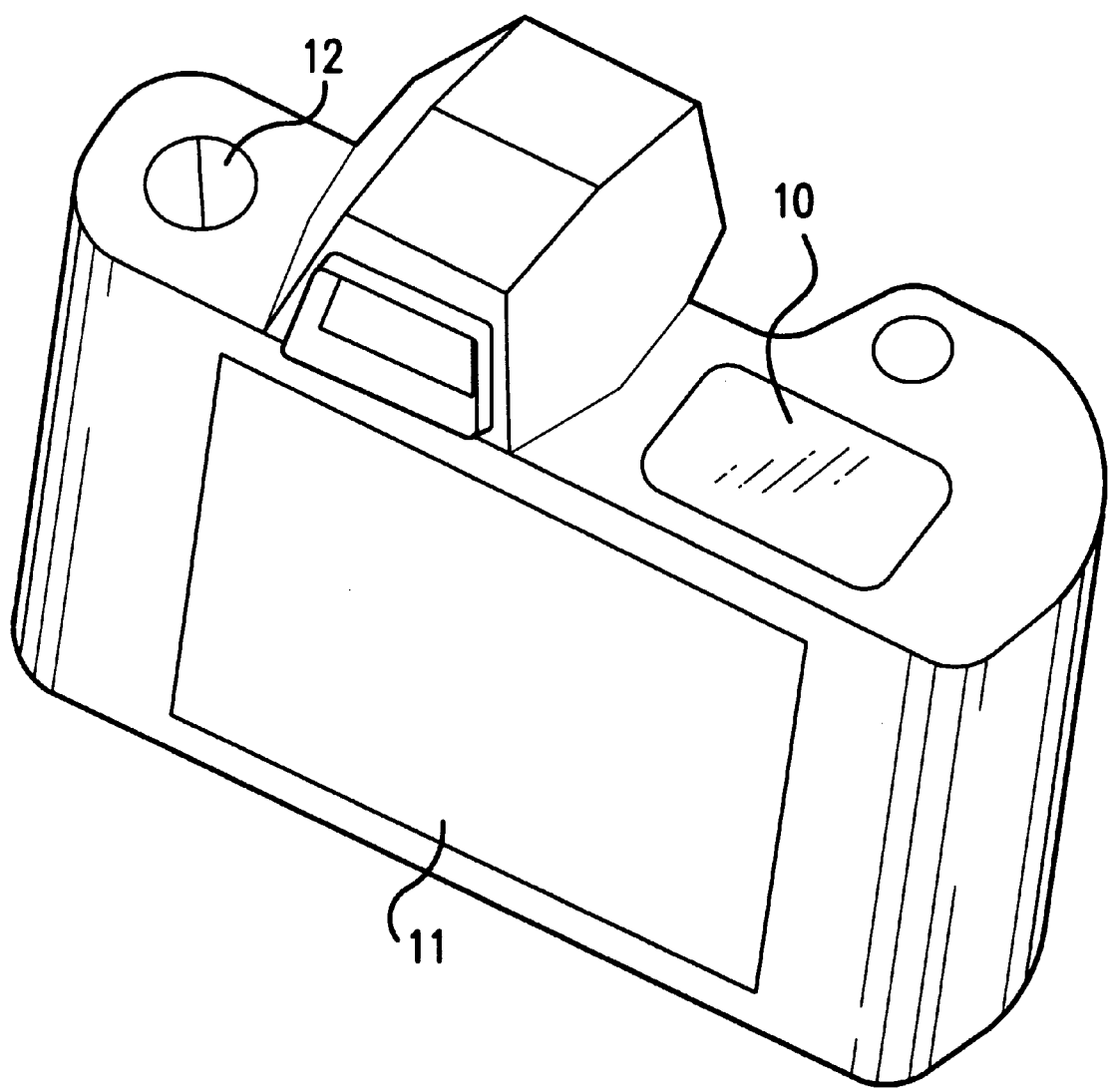
FIG. 11 is a back view of the camera of the invention as viewed from the direction of an upper right of a back side of the camera shown in FIG. 9.

FIG. 9 is a cross-sectional view of a camera according to the second embodiment. FIG. 10 is a view of the camera of FIG. 9 as viewed in a diagonal direction from an upper left of a front side of the camera. FIG. 11 is a view of the camera as viewed in a diagonal direction from an upper right of a back side of the camera.

As shown in FIG. 9, the camera includes photographic lens 1, and reflecting mirror 2 where the luminous flux of an object which is passed through the photographic lens 1 is reflected. After an image of the reflected luminous flux of the object is formed on focusing screen 3, it enters into pentaprism 4 within which it is reflected inside toward eyepiece lens 5 and photometric lens 6. The luminous flux of the object which is passed through eyepiece lens 5 is observed through finder 7 by the photographer. Photometry element 8 performs measurement of the illumination of the luminous flux of the object that passed through photometric lens 6.

Figure 12:
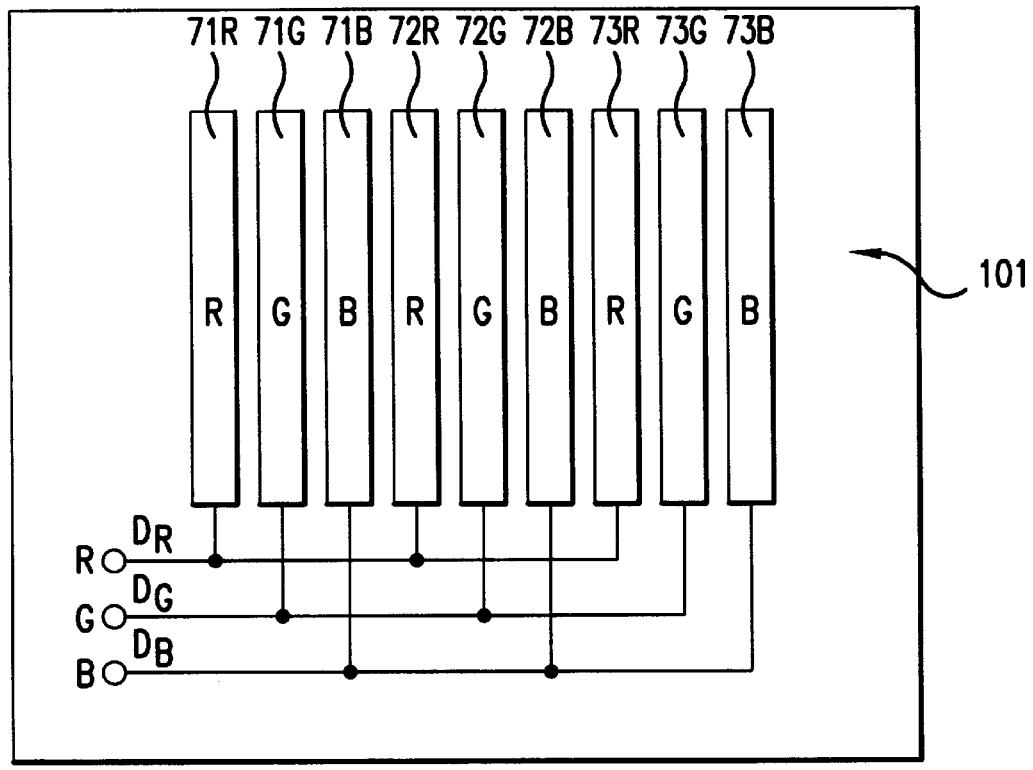
FIG. 12 shows the structure of the photometry element of the invention according to the second embodiment.
Figure 13:
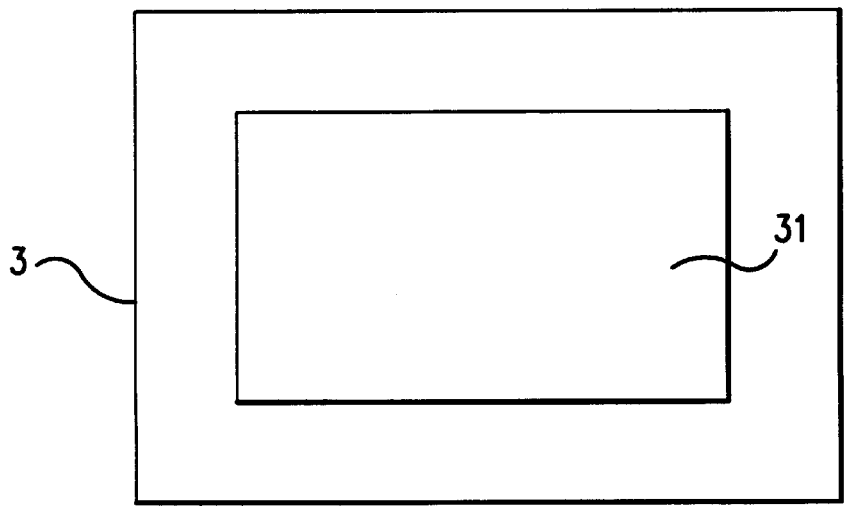
FIG. 13 shows the photometric area within the focusing screen of the invention according to the second embodiment.

FIG. 12 shows the internal structure of photometry element 8 while FIG. 13 shows the photometric range within the focusing screen 3. The photometry element 8 includes photoelectric conversion sensors 71–73 vertically aligned in multiple rows. At the front of each of the photoelectric conversion sensors 71–73, R (red) filter 71R, G (green) filter 71G and B (blue) filter 71B are each alternately attached.

FIG. 12, in order to simplify the explanation, shows an example in which a limited number, i.e., nine photoelectric conversion elements are arranged in a row. The photoelectric conversion sensors 71–73 which are attached in front of the R (red) filters 71R–73R detect the quantity of light of the red component which is included in the luminous flux of the object. The photoelectric conversion sensors 71–73 which are attached in front of the G (green) filters 71G–73G detect the quantity of light of the green component. The photoelectric conversion sensors 71–73 which are mounted in front of the B (blue) filters 71–73B detect the quantity of light of the blue component. In addition, the output of each of the photoelectric conversion sensors 71–73 are added to each of their own color components, and the resulting values are sent to the CPU as the sensor output value $D_R$ for the red components, the sensor output value $D_G$ for the green components, and the sensor output value $D_B$ for the blue components.

By arranging multiple photoelectric conversion sensors to which are attached the filters of R, G and B, the illumination of the each color component of the object field can be detected accurately. Further, it is desirable to arrange each photoelectric conversion sensor in a position where it can slide out of focus to some degree such that the luminous flux of the object enters into each photoelectric conversion sensor substantially equally. Additionally, each photoelectric conversion element as well as the filter is normally composed of one-chip LSI in order to constrain such things as noise and the dispersion of characteristics.

The second embodiment also includes a finder display component 9, which corresponds to the focusing screen 3 and is viewed within finder 7 as shown in FIG. 9; display component 10 which is placed on the top part of the camera as shown in FIG. 10; and display component 11 which is placed on the back of the camera as shown in FIG. 11. Next, the display of the information regarding various types of photography and color information by display components 9, 10, 11 will hereafter be described.

FIG. 9 shows the selector dial 12 that switches to either display of color information in each display component, or display of the photographic information other than the color information. The selector dial 12 is rotatable and the black triangle, shown in FIG. 9 opposing mark "CM", shows which display of the color information is selected. When the selector dial 12 aligns with mark "EXP", the display of photographic information other than the color information is selected. CPU 13 performs control of the entire camera, and ROM 14 stores the hereafter described color temperature conversion table and CC factor calculation table.

Figure 14A:
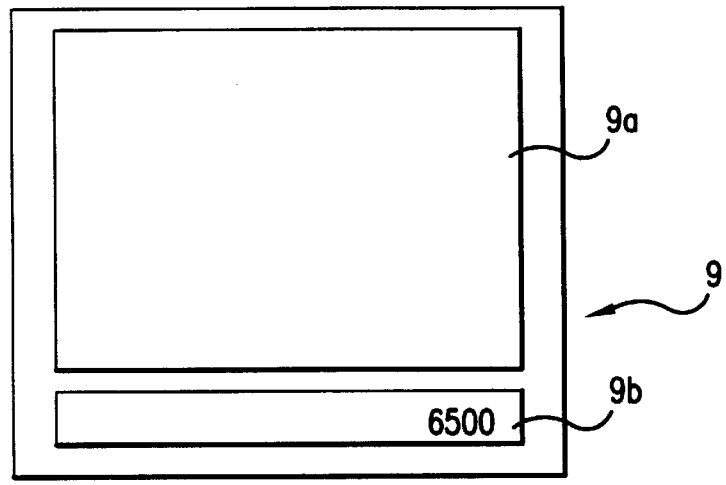
FIGS. 14(a)–14(c) show display examples of the finder display component of the invention according to the second embodiment.
Figure 14B:
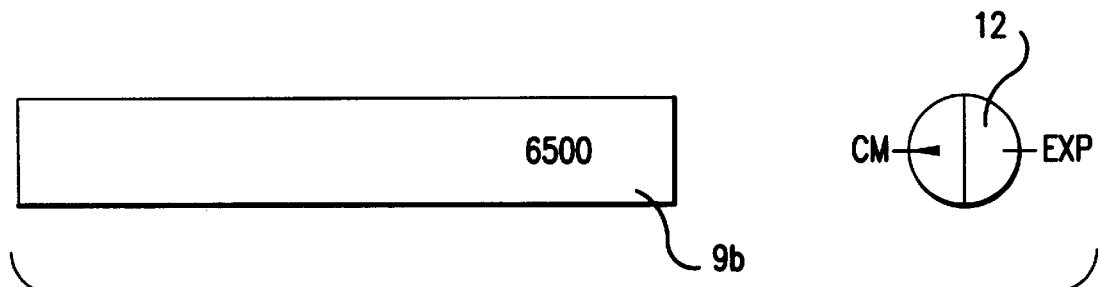
Figure 14C:
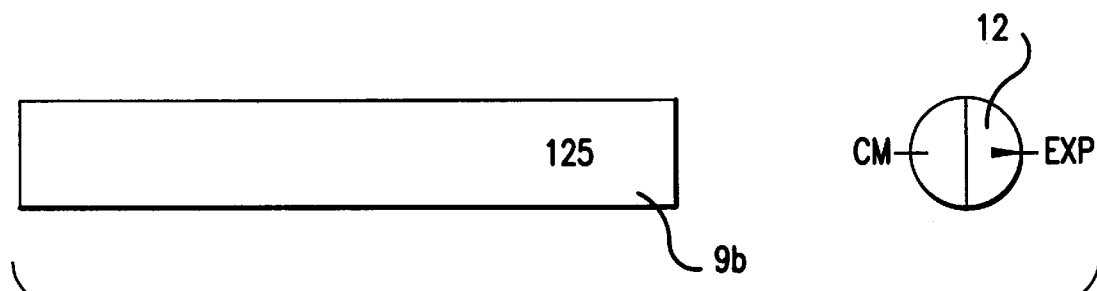

FIGS. 14(*a*)–14(*c*) show display examples of finder display component 9. As shown in FIGS. 14(*a*)–14(*c*), the finder display component 9 is divided into two display areas 9*a* and 9*b*. In display area 9*a* the object image is displayed while in display area 9*b* either the color temperature or the shutter speed is displayed. Specifically, where the photographer selects the display of the color information by means of selector dial 12, the color information is displayed, and where the photographer selects the display of the photographic information other than the color information, the shutter speed is displayed. FIGS. 14(*a*) and 14(*b*) show example displays that display 6500 K (kelvin) as the color temperature where the photographer has selected display of color information, and FIG. 14(*c*) shows an example display that displays 125 as the shutter speed where the photographer has selected display of photography information other than the color information.

Figure 15A:
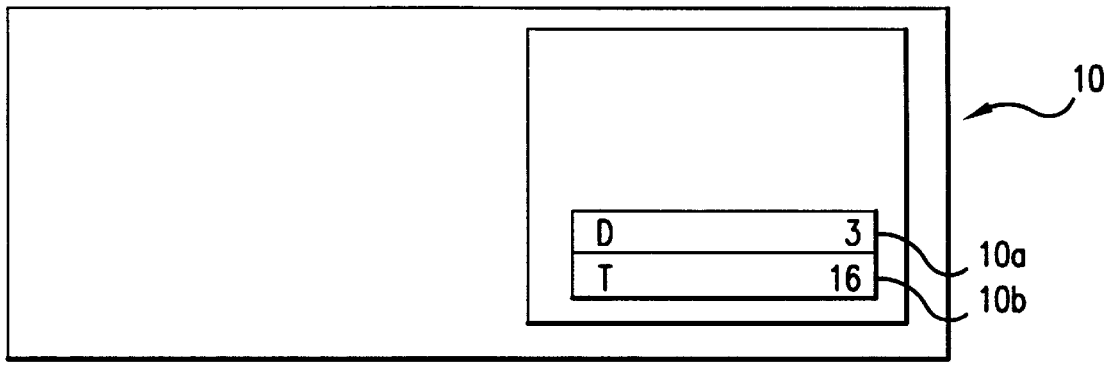
FIGS. 15(a)–15(c) show display examples of the display component which is on the top of the camera according to the second embodiment of the invention.
Figure 15B:
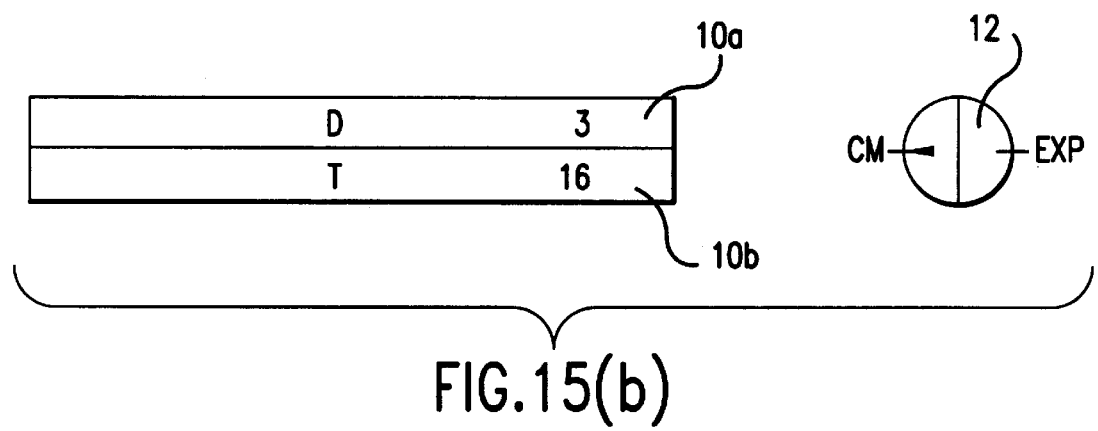
Figure 15C:
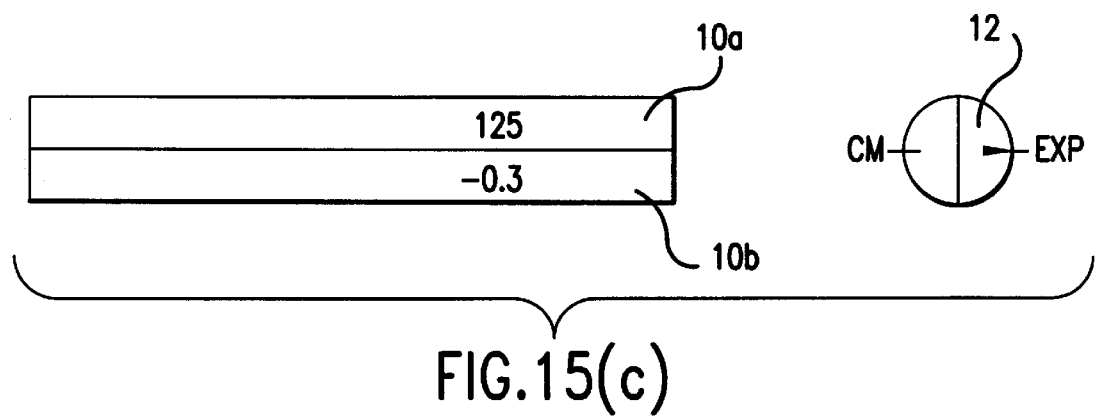

FIGS. 15(*a*)–15(*c*) show display examples of the display component 10. As shown in FIGS. 15(*a*)–15(*c*), display component 10 is divided into two display areas 10*a* and 10*b*. When the display of the color information is selected by means of selector dial 12, the light balancing factor (hereinafter called LB factor) that relates to the day light type of film is displayed in the display area 10*a*, and the LB factor that relates to the tungsten type of film is displayed in the display area 10*b* (FIGS. 15(*a*) and 15(*b*)). Here, the LB factor is a symbol that shows the type of LB filter that should be loaded in the camera. Meanwhile, when the display of the photographic information of other than the color information is selected by means of the selector dial 12, the shutter speed is displayed in the display area 10*a*, and the exposure revision value is displayed in the display area 10*b* (FIG. 15(*c*)).

In FIGS. 15(*a*) and 15(*b*), display examples are shown where the numeral 3 is displayed in the display area 10*a* as the LB factor of the day light type of film, and the numeral 16 is displayed in the display area 10*b* as the LB factor of the tungsten type of film. In the examples of FIGS. 15(*a*) and 15(*b*) the photographer has selected display of the color information. Meanwhile, in FIG. 15(*c*), a display example is shown where 125 is displayed in the display area 10*a* as the shutter speed, and –0.3 is displayed in the display area 10*b* as the exposure revision value. In the example of FIG. 15(*c*) the photographer has selected display of photographic information other than color information.

Figure 16A:
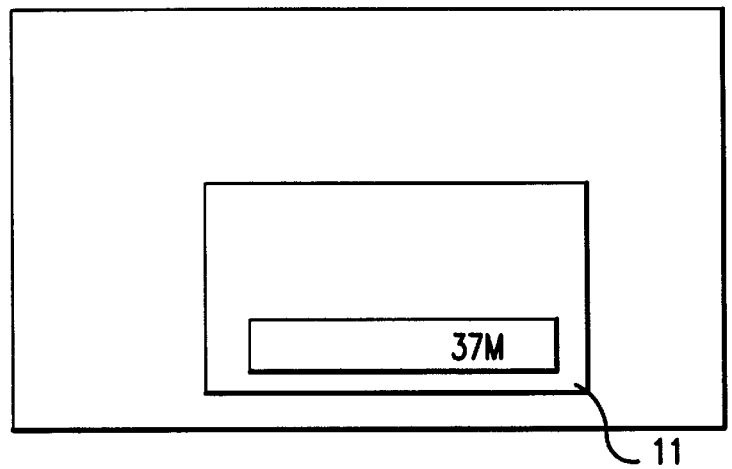
FIGS. 16(a)–16(c) show display examples of the display component which is on the back of the camera according to the second embodiment of the invention.
Figure 16B:
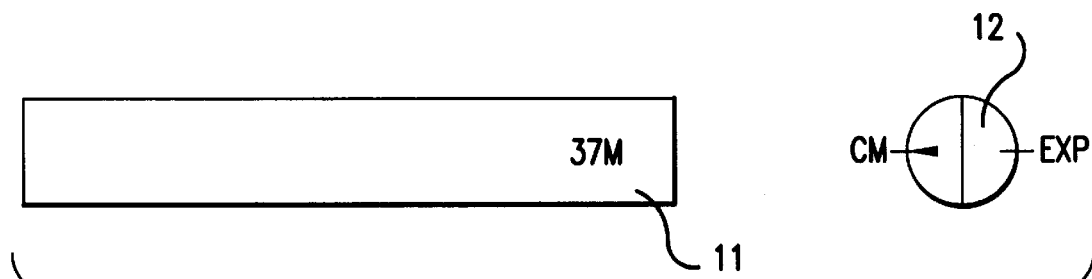
Figure 16C:
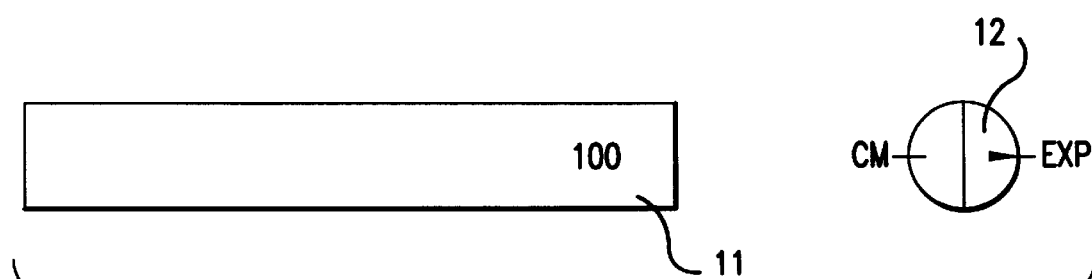

FIGS. 16(*a*)–16(*c*) show display examples of the display component 11. The color compensating factor (hereinafter called the CC factor) is displayed in the display component 11. In FIGS. 16(*a*) and 16(*b*) the photographer has selected display of color information. Here, the CC factor is a symbol that shows the type of CC filter which should be loaded into the camera. In FIG. 16(*c*) the ISO sensitivity is displayed in the display component II. In FIG. 16(*c*) the photographer has selected display of photographic information other than color information.

Figure 17:
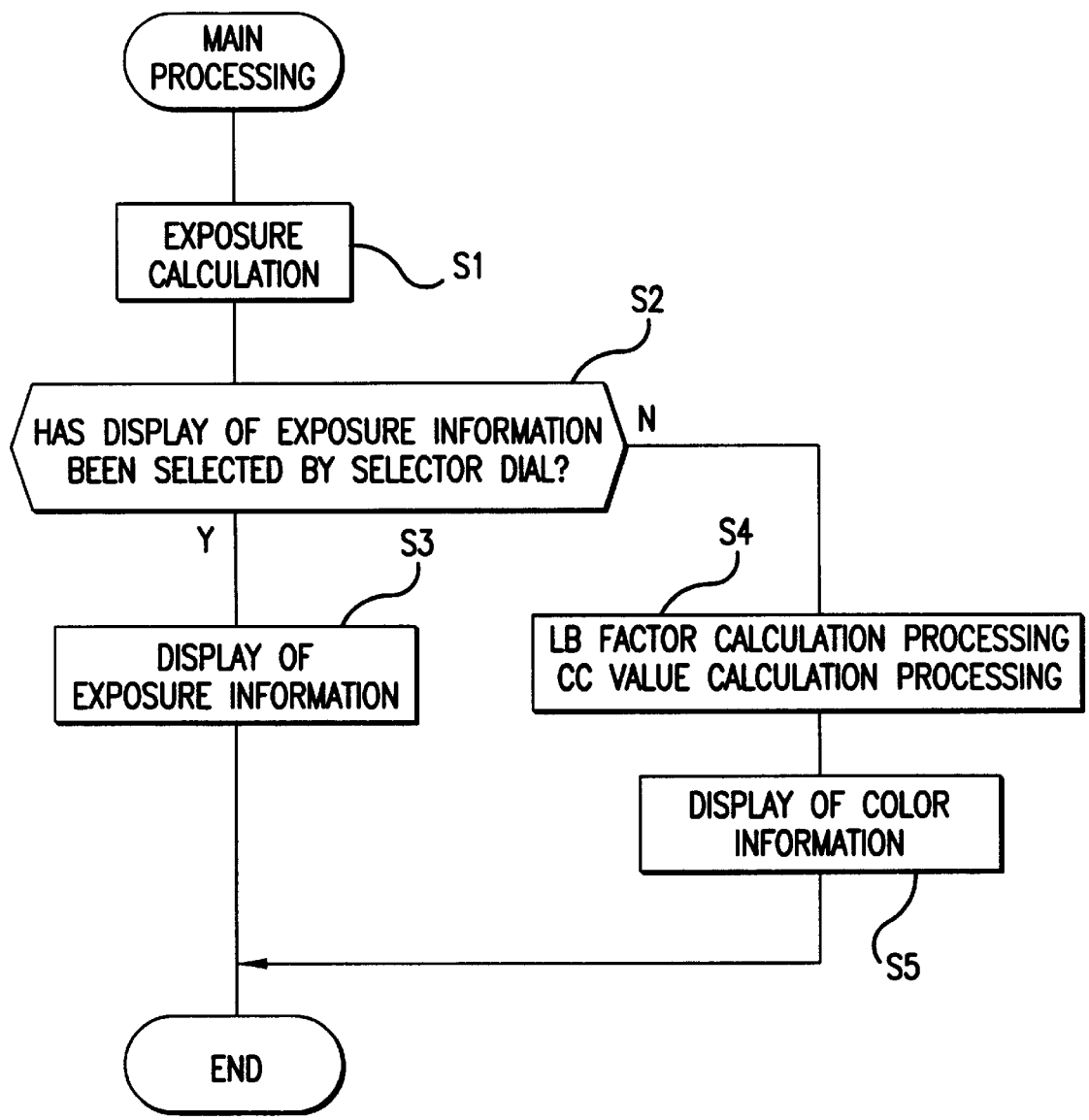
FIG. 17 is a flow chart that shows the main processing of the CPU according to the second embodiment.

FIG. 17 is a block diagram that shows the main process that the CPU 13 performs. The CPU 13 repeats the process of FIG. 17 on a predetermined interval when the release button is either pushed half-way down or pushed all the way down.

In step S1 of FIG. 17, the exposure calculation is performed by means of a well-known method based on the output of the photometry element, and the diaphragm value and the shutter speed for appropriate exposure are calculated. Step S2 determines whether the photographer selects the display of the exposure information by means of selector dial 12. If the photographer selects display of exposure information, the program moves on to step S3, and it performs display of the exposure information. Thus, the shutter speed which is supposed to be the appropriate exposure is displayed at display area 9*b* of finder display component 9 (see FIG. 14(*c*)), the shutter speed is displayed at the display area 10*a* of the display component 10 (see FIG. 15(*c*)), and the exposure revision value is displayed at the display area 10*b* (see FIG. 15(*c*)).

Figure 18:
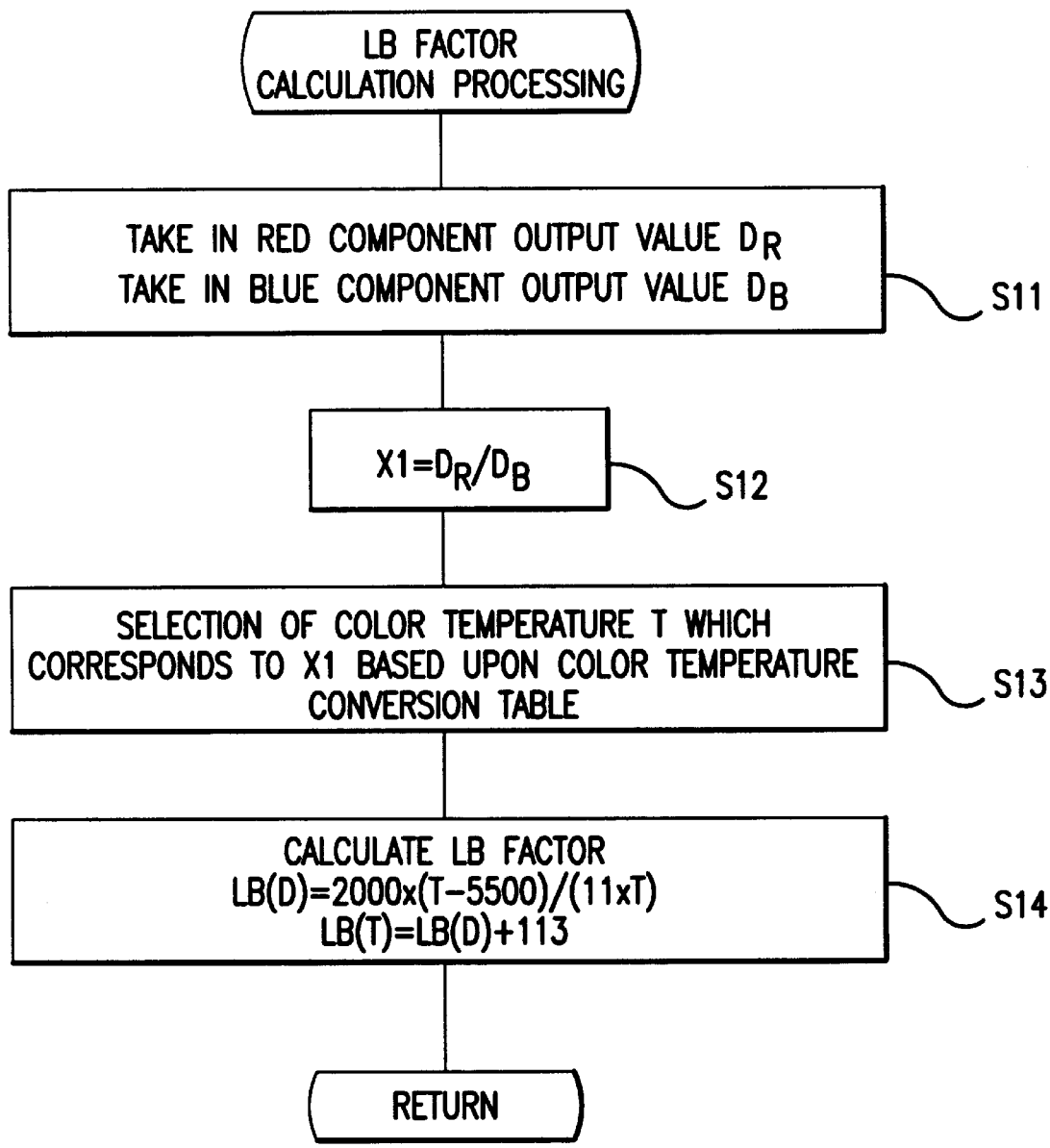
FIG. 18 is a flow chart that shows the LB factor calculation process of the CPU according to the second embodiment.
Figure 19:
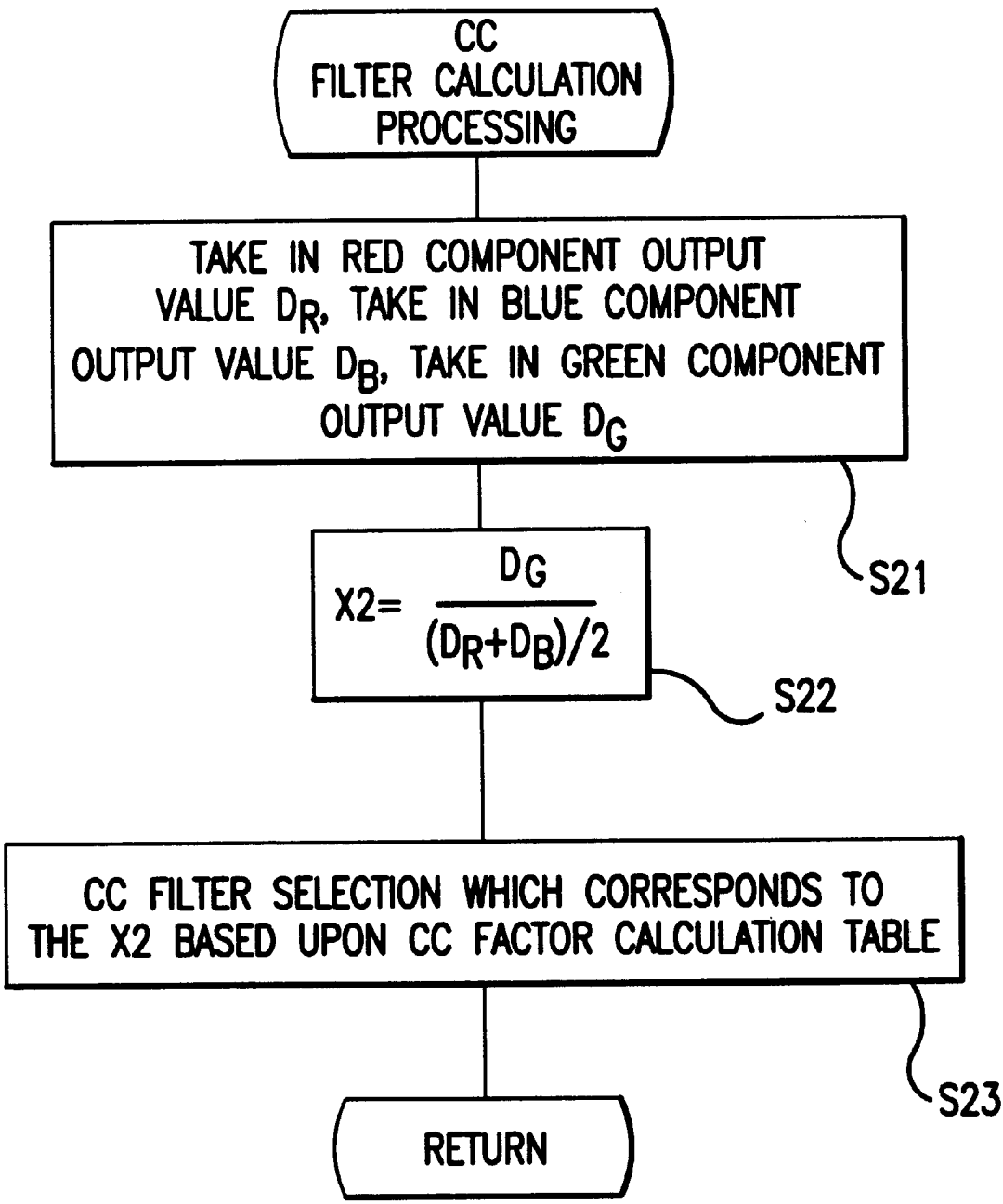
FIG. 19 is a flow chart that shows the CC factor calculation process of the CPU according to the second embodiment.

Meanwhile, if, in step S2, the photographer does not select display of exposure information, the program proceeds to step S4, and performs the LB factor calculation process of hereafter described FIG. 18 and the CC factor calculation process of FIG. 19, and selects the most appropriate LB filter for the color temperature of the object and the CC filter that depicts the object in the most appropriate color balance. Next, proceeding to step S5, the color temperature which was calculated at step S4 is displayed in the finder display component 9 (refer to FIGS. 14(a)–14(b)), and furthermore, the LB filter that was selected at step S4 is sorted by each photo-sensitive material and displayed in the display component 10 (refer to FIGS. 15(a)–15(b)). At the same time, the CC filter which was selected at step S4 is displayed in the display component 11 (refer to FIGS. 16(a)–16(b)).

FIG. 18 is a flow chart that shows the specification of the LB factor calculation process which is performed at step S4 of FIG. 17. Step S11 of FIG. 18 takes into account the blue component output value $D_B$ and the red component output value $D_R$ which are output from the photometry element 8. Step S12 calculates the ratio X1 between the red component output value $D_R$ and the blue component output value $D_B$. Step S13, based upon the color temperature conversion table which is stored in the ROM 14, selects the color temperature T that corresponds to the ratio X1, which is calculated at step S12.

Figure 20:
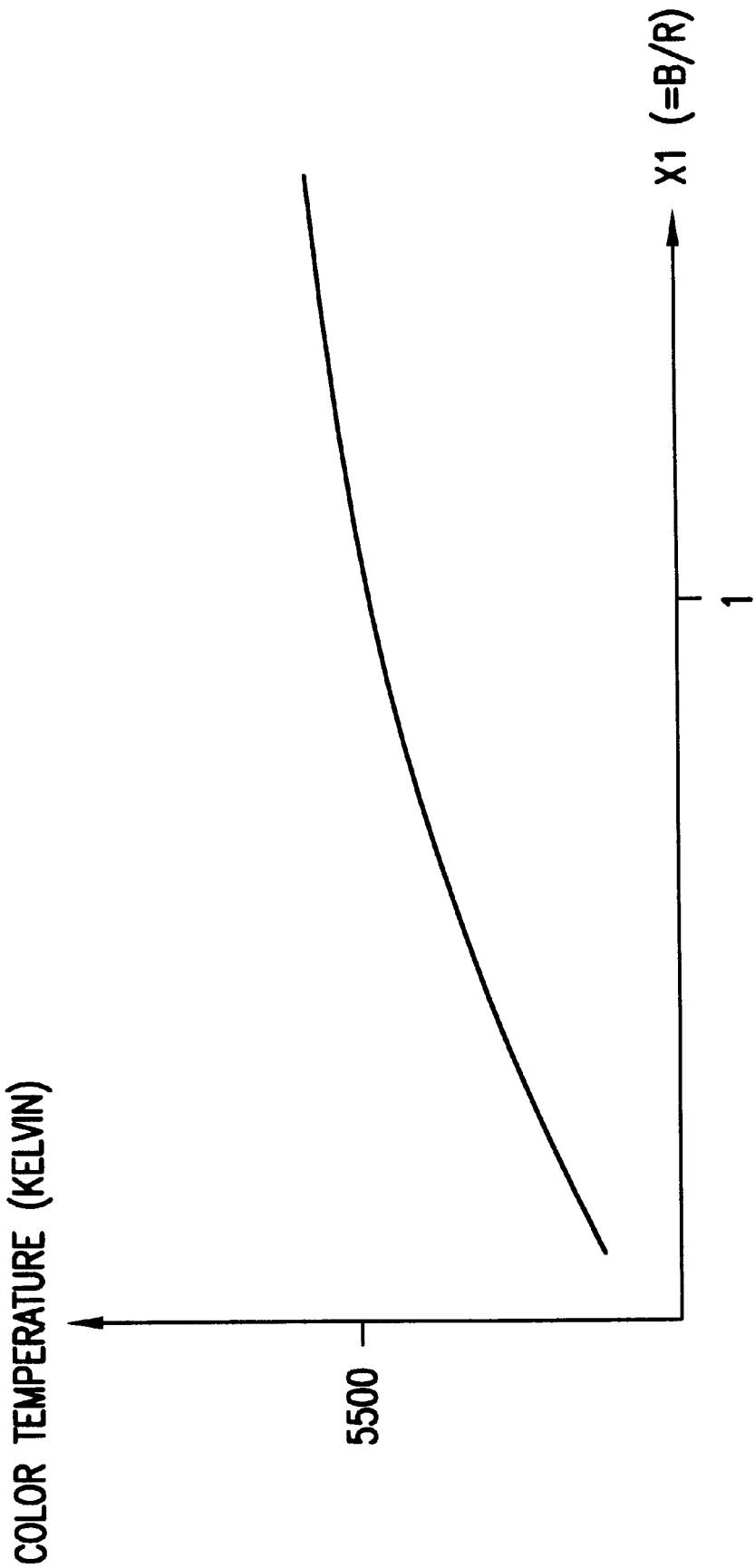
FIG. 20 shows the characteristics of the color temperature conversion calculation table according to the second embodiment.

FIG. 20 shows a color temperature conversion table wherein the horizontal axis represents the ratio X1, which is calculated at step S12, and the vertical axis represents color temperature. In the ROM 14, there are values stored along multiple locations within the curved line of FIG. 20.

Step 14 calculates the LB factor based upon formula (1) when the day light film is used, and it calculates the LB factor based upon formula (2) when the tungsten film is used. Moreover, the T in both formulas (1) and (2) represents the color temperature which is calculated at step S13.

$$LB(D)=2000\times(T-5500)/(11\times T) \quad (1)$$

$$LB(T)=LB(D)+113 \quad (2)$$

FIG. 9 is a flow chart that shows the specifications of the CC factor calculation process which is performed at step S4 of FIG. 17. Step S21 of FIG. 19 takes into account the green component output value $D_G$ and the red component output value $D_R$ which are output from the photometry element 8. Step S22 calculates the ratio X2, of the average value between the red component output value $D_R$ and the blue component output value $D_B$ with the green component output value $D_G$, based upon the formula (3).

$$X2=D_G/\{(D_B+D_R)/2\} \quad (3)$$

Figures 21, 22:
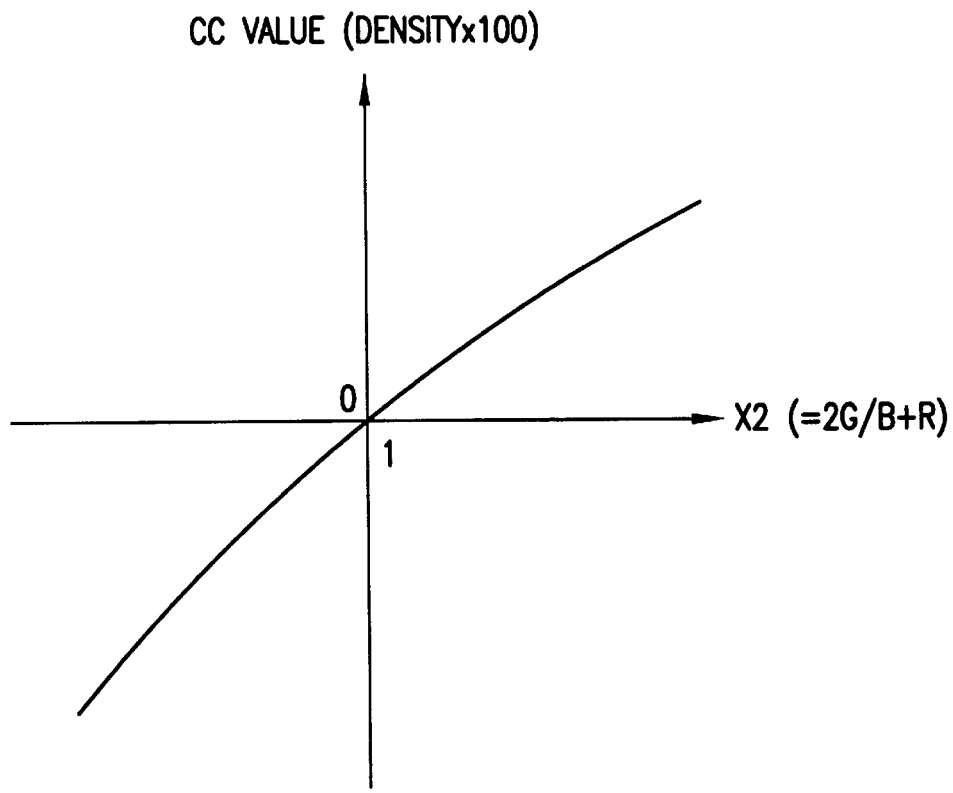
FIG. 21 shows the characteristics of the color CC factor calculation table according to the second embodiment.
FIG. 22 shows the comparison of the display contents of each display component according to the second embodiment.

FIG. 21 shows the CC factor calculation table with the horizontal axis representing the ratio X2 which is calculated at step S12, and the vertical axis representing the CC factor. In the ROM 14, there are values stored in multiple locations within the curved line of FIG. 21.

Now, when all of the functions or steps of the second embodiment explained above are put together, it is seen that when the photographer either presses the release button half way down or by pressing it all the way down, the CPU, first, performs the exposure calculation and calculates the appropriate exposure for the aperture value and the shutter speed. Next, it detects the status of the selector dial 12, and, when display of the photographic information other than the color information is selected, it displays the shutter speed at the display area 9b of the finder display component 9, it displays the shutter speed and the exposure revision value at the display component 10, and it displays the ISO sensitivity of the film at the display component 11.

When the display of the color information is selected by the selector dial 12, the program calculates the color temperature T of the object based upon the output of photometry element 8, and using such calculated color temperature T, it calculates the LB factor according to each photo-sensitive material. In addition, it calculates the CC factor based upon the output of the photometry element 8. Further, it displays the color temperature of the object field in the display area 9b of the finder display component 9, and it displays the LB factor according to each photo-sensitive material in the display component 10 and displays the CC factor in the display component 11.

FIG. 22 is a table showing which display contents are displayed in each of the display components 9, 10, and 11.

According to the second embodiment, because is it possible to display each type of color information that relates to the object in each display component 9, 10, and 11 which are provided in multiple locations of the camera, it is no longer necessary to carry a colorimeter in addition to the camera, and the work of photography becomes easier. Further, because the color information is displayed only where it is selected by the selector dial 12, the color information is not displayed when it is not necessary, and the display of the display component becomes easier to look at. Further, the possibility of conveying a misunderstanding to the photographer is substantially avoided. In addition, because the color information is displayed on the display components which are provided on the camera of the prior art, it is not necessary to provide new display components to display the color information, and a reduction in cost results. Additionally, because the LB filter and the CC filter can be confirmed without looking into the finder, the same usage as the colorimeter is possible and operational ability is improved.

With the aforementioned second embodiment, the color temperature of the object is displayed within the finder display component 9, however, it is also permissible to display the color information in other display components. In doing so, it becomes possible to confirm the color temperature without looking through the finder. In addition, the location of the display of the LB factor and the CC factor are not limited to the aforementioned embodiment.

According to the aforementioned second embodiment, the LB factor for two categories of measurement, that is, for day light type film and for tungsten type film, are calculated. However, it is also permissible to calculate the LB factor which relates to other photo-sensitive material. In addition, the color information which is displayed is not limited to the aforementioned embodiment.

With the aforementioned embodiment, each type of color information is displayed in the display components that are within the finder and either on the top of the camera or on the back of the camera. However, it is also permissible to display the color information in a display component in another location, for example, in a display component on an under-side of the camera or so forth.

With the aforementioned second embodiment, when display of photographic information other than the color information is selected, the shutter speed, exposure revision value, or ISO sensitivity value are displayed. However, it is also permissible to display other values, for example, aperture value or post-photography photo count.

Thus, according to the second embodiment of the invention, because multiple color information is displayed as necessary for photography according to each type of information, each in differing display components, it is possible to confirm specific color information at the same time. Accordingly, confirmation of specific color information can be accomplished without the use of a separate colorimeter, and the task of photography preparation becomes easier.

Further, since color information is displayed only when it is selected by the photographer, it will not display the color information where the photographer does not require it. This makes the display of the display component easier to look at. Also, this reduces the possibility of photographer confusion.

Additionally, since color information which corresponds to the types of photo-sensitive material is displayed, the most appropriate color information on the photo-sensitive material of the film which is used is immediately understood.

Also, because the color information of the object field is calculated and displayed, adjustment of the color temperature becomes easier.

Because the information which relates to the light balancing filter is calculated and displayed, it becomes possible to perform conversion of the color information with accuracy.

Additionally, because the information which relates to the color compensating filter is calculated and displayed, it becomes possible to perform the adjustment of the color balance with accuracy.

Because a display component is provided within the finder and either on top of the camera or on the back of the camera, it is possible to display the color information by continuing to use the display components of the prior art. In addition, because the color information is displayed in an easily viewed location, it becomes possible to understand the color information in one look.

Because the color information is displayed in the display components which are provided on the external surface of the camera, the color information can be confirmed without looking into the finder, and the same usage as the colorimeter is possible and the operational ability is improved.

Further, because the color information which changes minutely can be confirmed while looking through the finder, such information can be obtained accurately in relation to an object field for which photometry is desired, and the light balancing filter information can be confirmed at the external display component and thus the work of selection of the light balancing filter can be performed smoothly.

Figure 23:
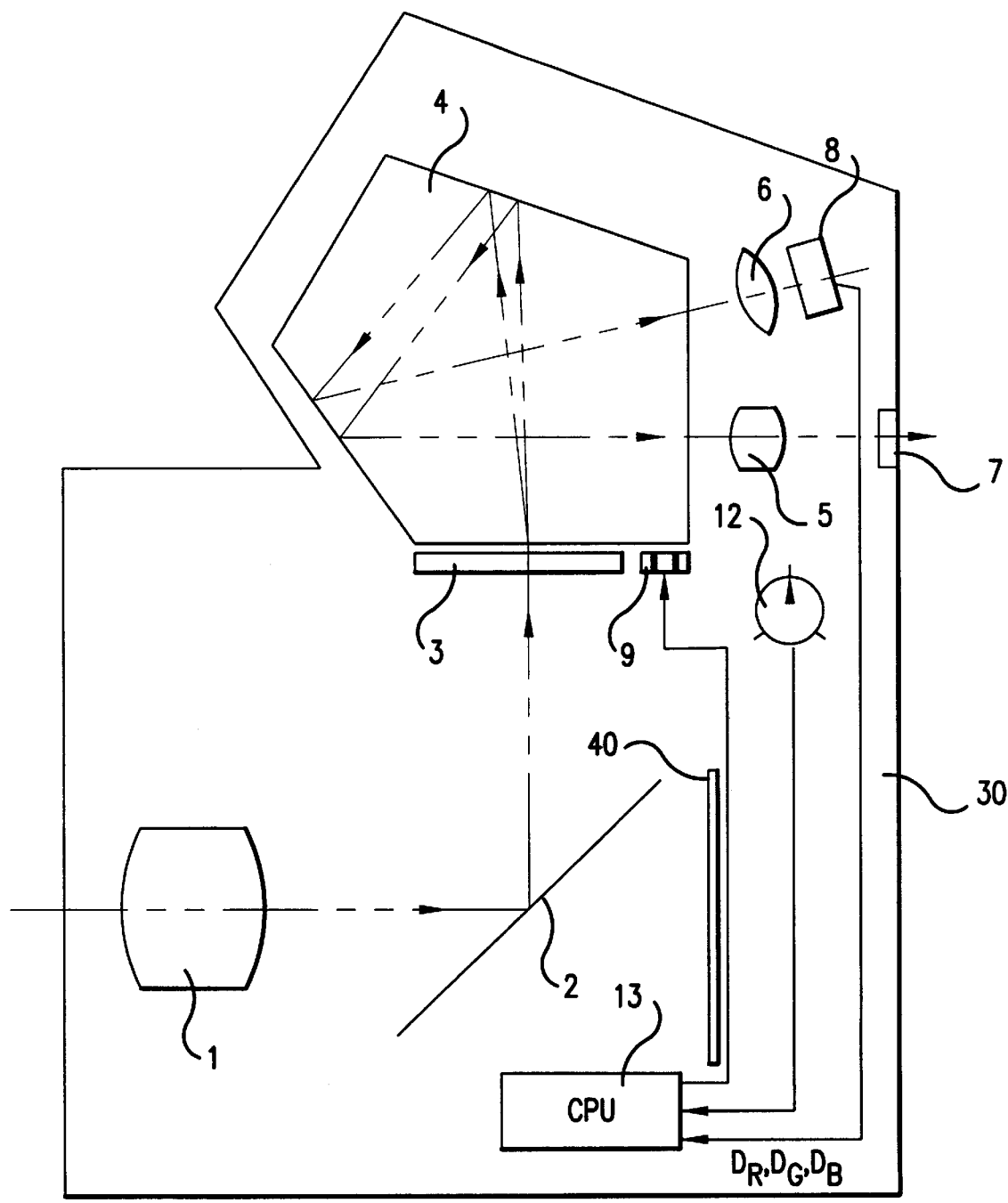
FIG. 23 is a schematic side view of a camera according to a third embodiment of the invention.

FIG. 23 is a schematic diagram of a camera in accordance with the invention. The shooting lens 1 receives light from the object field. Reflective mirror 2 reflects the incident light to focusing screen 3 so that the reflected light forms an image on focusing screen 3. Penta-prism 4 reflects the light that forms the image on focusing screen 3 and forms an image on eyepiece lens 5. The user verifies the object field, which is formed on focusing screen 3, through eyepiece lens 5. Eyepiece lens 5 makes up the viewfinder 7.

The photometry lens 6 directs the light from penta-prism 4 into photometry device 8. The photometry device 8 measures the incident light of each color component of red, green and blue, and outputs the photometry value of each color component to a controller, which in the FIG. 1 example is CPU 13. CPU 13 uses the photometry values input from the photometry device 8 to determine color temperature, the light balancing factor (LB-value, that is, LB-value LB(D) of the day light type film, which is the first type of photosensitive material, and the LB-value LB(T) of the tungsten type film, which is the second type of photo-sensitive material), and the color compensating factor (CC-value), as the color information used to photograph the object field at an appropriate color balance. Further, CPU 13 uses the information output from photometry device 8 to determine the shutter speed and the diaphragm value, which constitute appropriate exposure values. The color temperature, light balancing factors, color compensations factor, shutter speed and diaphragm values can be determined by well known processes.

The color information display apparatus 9 displays parameters determined by CPU 13. Display 9 is arranged in a position to be visible at a lower section of focusing screen 3 when the user looks through eyepiece lens 5 (viewfinder 7). The user can verify the parameters displayed along with the object field on color information display 9 by observing eyepiece lens 5 (viewfinder 7).

The display interchange dial 12 is shown on the inside of the camera body 30 in FIG. 23, but in reality it is arranged on an outside of the camera body 30. The mode for displaying parameters on the color information display 9 is switched to one of three modes by operating the display interchange dial 12 as discussed below.

The display interchange dial 12 is operated to change the mode to: the first mode (CM 1), in which color information display 9 simultaneously displays the color temperature, the LB-value LB(D) (for use when the film type is the day light type) and the LB-value LB(T) (for use when the film type is the tungsten type), and the CC-value CC; the second mode (CM 2), in which color information display 9 simultaneously displays the color temperature, the LB filter name corresponding to the LB-value LB(D) when the film type is the day light type, the LB filter name corresponding to LB-value LB(T) when the film type is the tungsten type, and the CC filter name corresponding to CC-value CC; or the third mode (EXP), in which the color information display 9 simultaneously displays the shutter speed and the diaphragm value. The film 40 on which the picture of the object field is taken is either the day light type film or the tungsten type film as described above.

Figure 24:
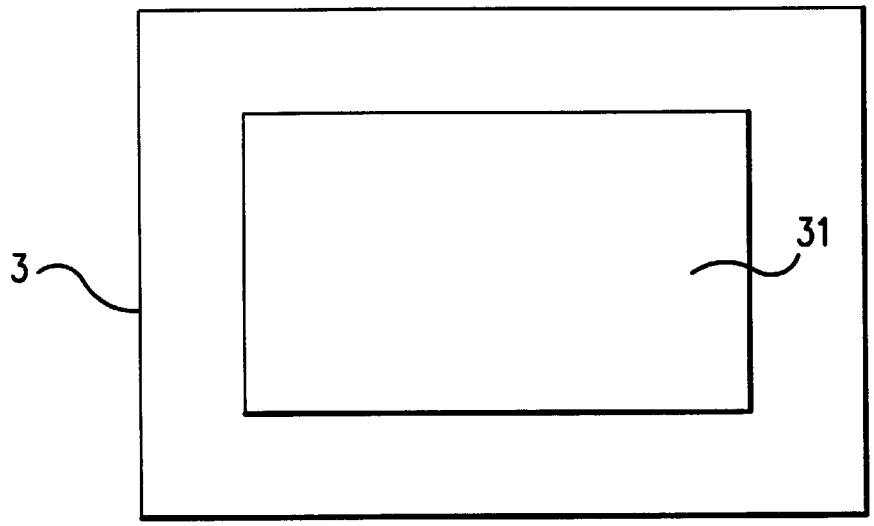
FIG. 24 shows the color measurement range of the focusing screen in the camera of FIG. 23.

FIG. 24 shows the focusing screen 3. The light from the object field reflected by reflective mirror 2 forms an image on focusing screen 3. The range of photometry of photometry device 8 in FIG. 23 is defined to be within central region 31 on focusing screen 3, as shown in FIG. 24. However, the range in which light is measured by photometry device 8 does not have to be within central region 31 of focusing screen 3. The light may be measured at a plurality of predetermined locations on focusing screen 3, and the average value may be used as the photometry value. Alternatively, the photometry range may be defined as within central region 31 and the user may move the camera to point toward various directions, the photometry value being stored for each direction and determining the average value as the photometry value.

Figure 25:
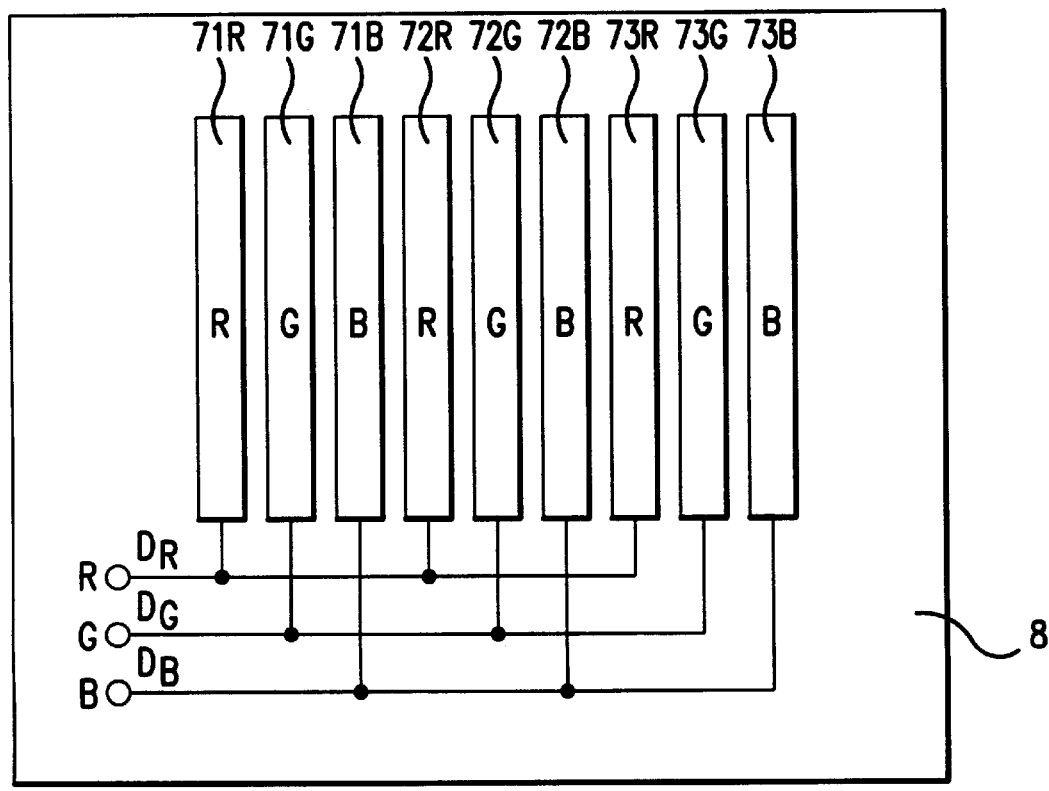
FIG. 25 shows the structure of the photometry element in the camera of FIG. 23.

FIG. 25 shows structure of photometry device 8 in FIG. 23. The photometry device 8 includes a one chip type color photosensor that uses a stripe filter. A color filter is attached in front of the photosensor and is in the form of a rectangular strip divided into 9 sections. A color filter R (red) is provided for photosensors 71R, 72R, 73R, a color filter G (green) is provided for photosensors 71G, 72G, 73G, and a color filter B(blue) is provided for photosensors 71B, 72B, 73B, respectively.

With the above described structure, photometry output of the R (red) component is obtained at photosensors 71R–73R, photometry output of the G (green) component is obtained at photosensors 71G–73G, and photometry output of B (blue) is obtained at photosensors 71B–73B, respectively. The photometry outputs for each color component are added and sent to CPU 13 as R-component sensor data $D_R$, G-component sensor data $D_G$, and B-component sensor data $D_B$.

For simplicity, photometry device 8 is illustrated as a rectangular strip divided into 9 sections that include photosensors 71R–73R, 71G–73G, and 71B–73B, but in actuality, it is divided into many more sections for each color component of incident light. Further, photometry device 8 is arranged at a location where it is slightly out of focus so that uniform light is illuminated on each photosensor 71R–73R, 71G–73G and 71B–73B.

The operation of the camera described in FIGS. 23–25 will be described hereafter, with reference to the flow charts in FIGS. 26–28.

The light from the object field enters into the camera through shooting lens 1. The incident light is reflected by reflective mirror 2, forming an image on focusing screen 3. Next, the light that formed the image is reflected twice more by penta-prism 4, and forms an image at eyepiece lens 5. The user verifies the object field by observing the image formed.

Figure 26:
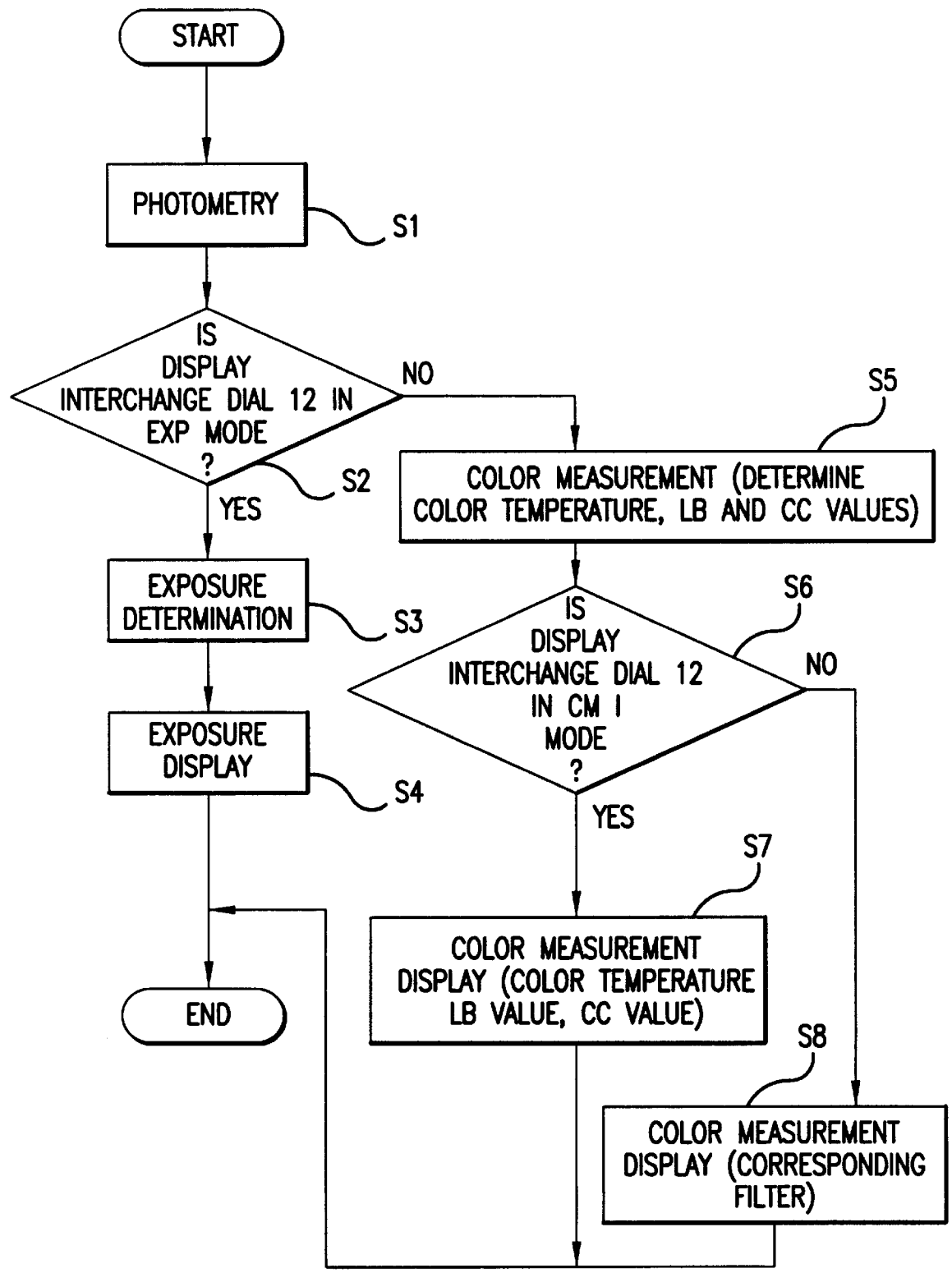
FIG. 26 is a flow chart that explains the operation of the camera of FIG. 23.

The process of FIG. 26 starts when a release button (not shown) is half depressed after the main, or power, switch (not shown) of the camera is turned ON, or when a time limit timer (not shown) is activated by a half-depression of the release button.

First, in step S1, photometry is performed for the object field, after which the program proceeds to step S2. In step S2, CPU 13 determines whether display interchange dial 12 is switched to the third mode (EXP), wherein the shutter speed and the diaphragm value are displayed. If CPU 13 determines that the display interchange dial 12 is switched to the third mode, the program proceeds to step S3. In step S3, CPU 13 determines the shutter speed and the diaphragm value that constitute appropriate exposure values of the object field using the photometry values input from the photometry device 8, after which the program proceeds to step S4. In step S4, CPU 13 causes simultaneous display of the shutter speed and the diaphragm value at the predetermined position (to be explained later) in color information display 9 and completes the operation.

When CPU 13 determines that display interchange dial 12 is not switched to the third mode in step S2 (in other words, it is switched to the first or the second mode), the program proceeds to step S5. In step S5, CPU 13 executes the color measurement, that is, the process for determining the LB-value and the CC-value, described in FIGS. 27 and 28.

Figure 27:
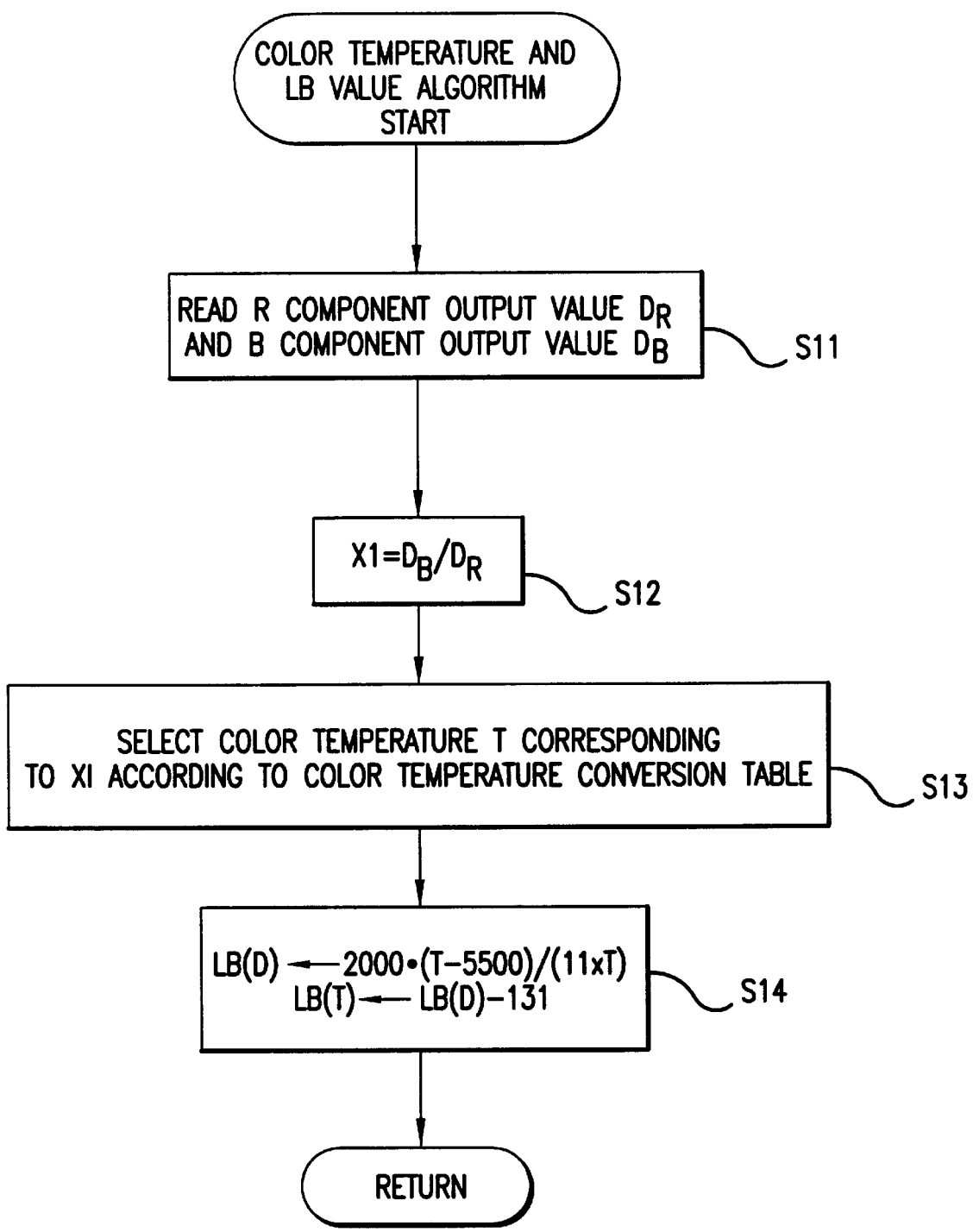
FIG. 27 is a flow chart that explain s the process of determining color temperature and LB-value in the FIG. 26 flow chart.

FIG. 27 is a flow chart for the color measurement process that determines the color temperature and the LB-value LB(D) when the film type is the day light type and the LB-value LB(T) when the film type is the tungsten type, of step S5 described in FIG. 26. In step S11, CPU 13 reads the B component sensor data $D_B$ and the R component sensor data $D_R$ from photometry device 8. In step S12, CPU 13 determines the ratio X1 ($=D_B/D_R$).

In step S13, a predetermined table, prestored in CPU 13, is used by CPU 13 to determine (look-up) the color temperature T (kelvin) based on the value X1 obtained in step S12. In step S14, using the color temperature T, the LB-value LB(D) ($10^{-6}$K (mired)) for the day light type of film and the LB-value LB(T) ($10^{-6}$K (mired)) for the tungsten type film are determined using the following equations:

$$LB(D)=2000\times(T-5500)/(11\times T)$$

$$LB(T)=LB(D)+131$$

Figure 28:
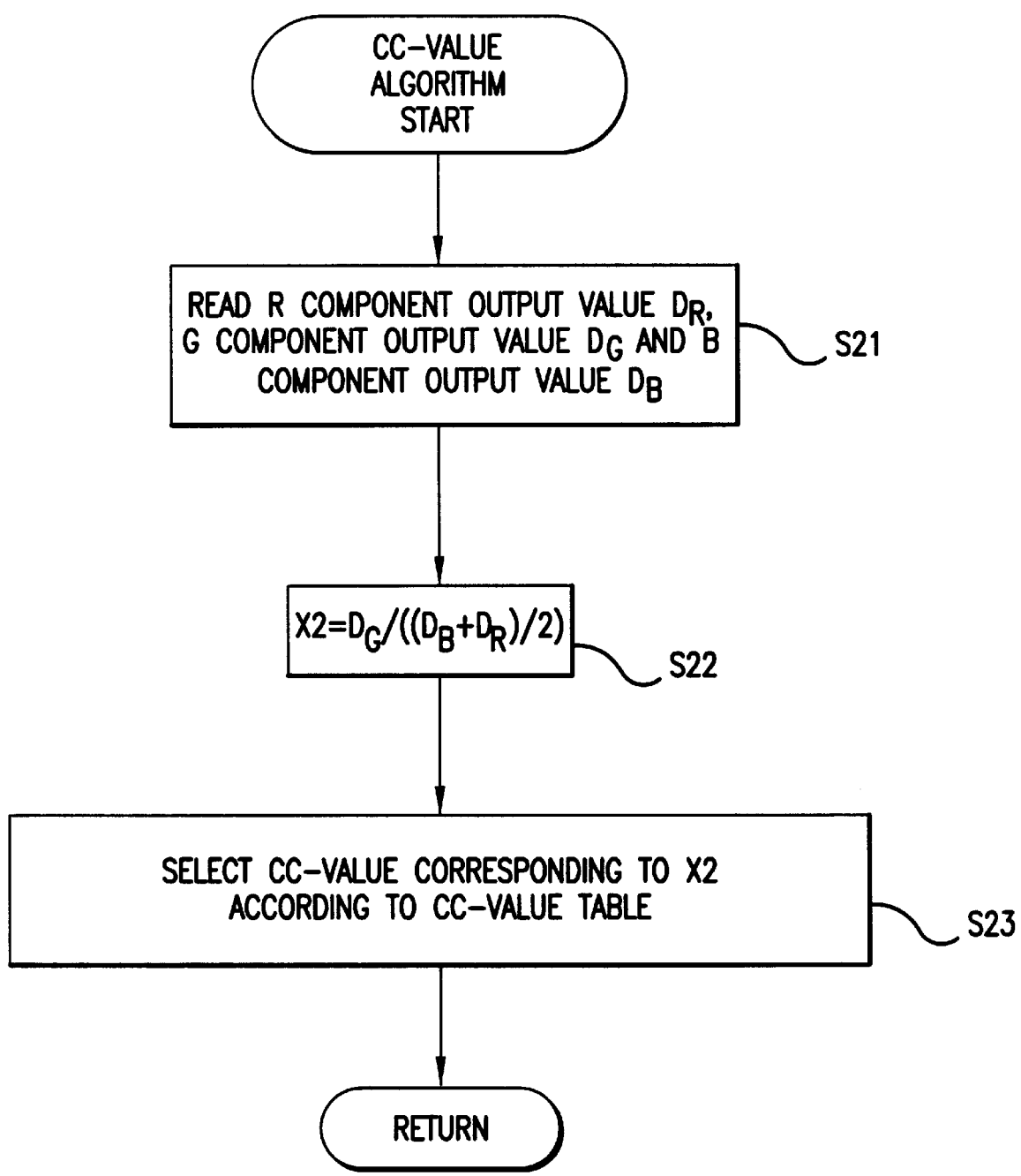
FIG. 28 is a flow chart that explains the process of determining CC-value in the flow chart of FIG. 26.

FIG. 28 is a flow chart of the color measurement process that determines the CC-value CC, of step S5 described in FIG. 26. In step S21, CPU 13 reads the B component sensor data $D_B$, the R component sensor data $D_R$, and the G component sensor data $D_G$ from photometry device 8. In step S22, CPU 13 determines X2 using the following equation.

$$X2=D_G/((D_B+D_R)/2)$$

Next, in step S23, the CPU 13 uses a predetermined table to determine (look-up) the CC-value CC based on the obtained value X2.

Upon completion of the color measurement process described in FIGS. 27 and 28, the program proceeds to step S6 in FIG. 26 to determine whether display interchange dial 12 is switched to the first mode (CM 1). If CPU 13 determines that display interchange dial 12 is switched to the first mode, the program proceeds to step S7 and CPU 13 causes simultaneous display of the color temperature, the LB-value LB(D) for the day light type film, the LB-value LB(T) for the tungsten type film, and the CC-value CC at a predetermined position (to be explained later) in color information display 9, after which the operation is completed.

On the other hand, if CPU 13 determines that display interchange dial 12 is not switched to the first mode (CM 1) (in other words the dial is switched to the second mode (CM 2)), the program proceeds to step S8.

In step S8, CPU 13 causes simultaneous display of the color temperature, the LB filter name corresponding to LB-value LB(D) for day light type film, the LB filter name corresponding to the LB-value LB(T) for the tungsten type film, and the CC filter name corresponding to the CC-value CC at a predetermined position (to be explained later) in color information display 9, after which the operation is completed.

The CPU 13 uses sensor data $D_R$, $D_G$, $D_B$ input from photometry device 8 in the exposure process of step S3; and uses the computations of the color information stated above in the color measurement process of step S5 (in other words, when display interchange switch dial 12 is switched to either the first mode or the second mode).

Figure 29:
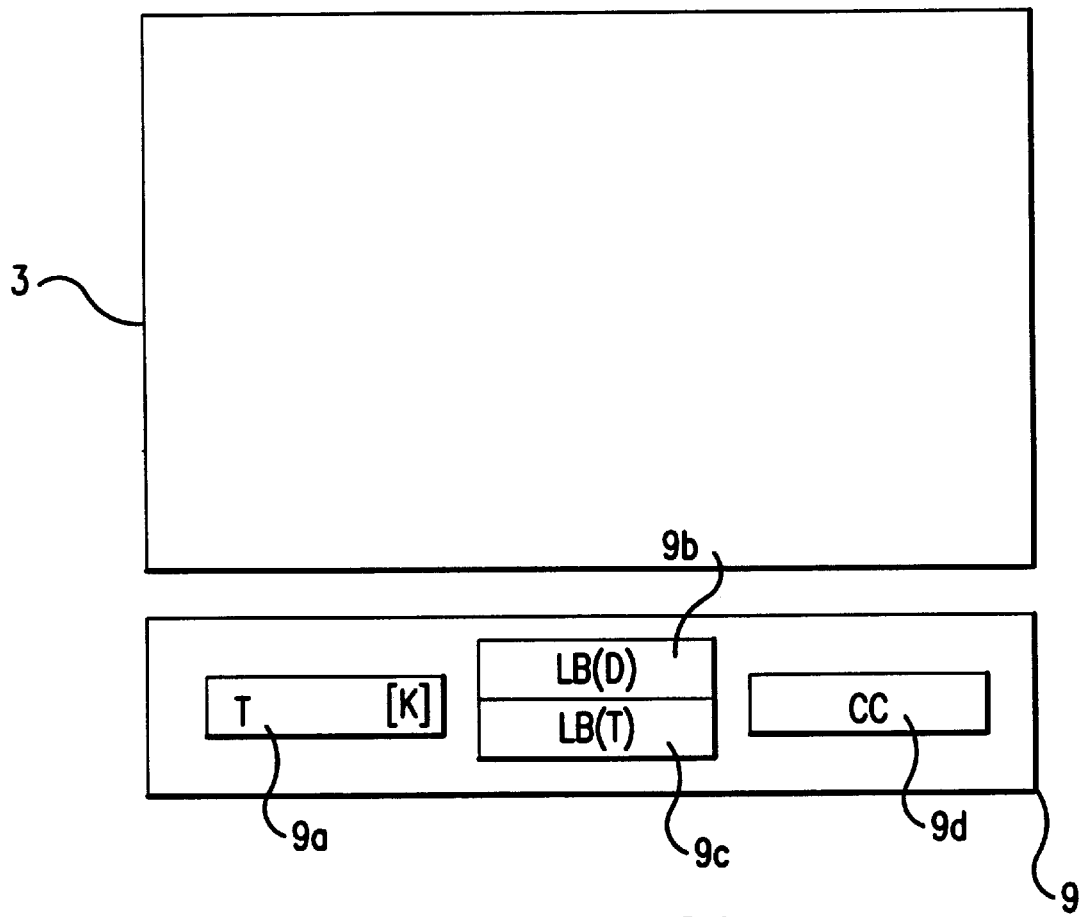
FIG. 29 shows examples of displays of the focusing screen and of the color information display that can be observed through the eyepiece lens in the camera of FIG. 23.

FIG. 29 shows examples of displays of focusing screen 3 and color information display 9, which the user can see inside the viewfinder 7 of the camera, through eyepiece lens 5 of FIG. 23. In viewfinder 7, color information display 9 is arranged at the lower part of focusing screen 3. When display interchange dial 12 is switched to the first mode (CM 1), the color temperature T, the LB-value LB(D) for the day light type film and the LB-value LB(T) for the tungsten type film and CC-value are displayed in order from left to right in display portions 9a, 9b, 9c, 9d. Alternatively, it is possible to arrange color information display apparatus 9 on an outside of the camera body 30 instead of at the visible position within viewfinder 7.

Figure 30A:
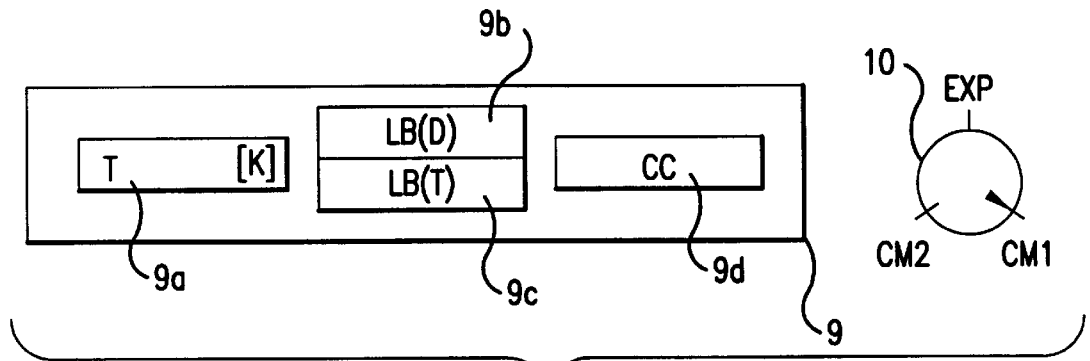
FIGS. 30(a)–30(c) show examples of additional displays that can be made on the color information display of the camera of FIG. 23.
Figure 30B:
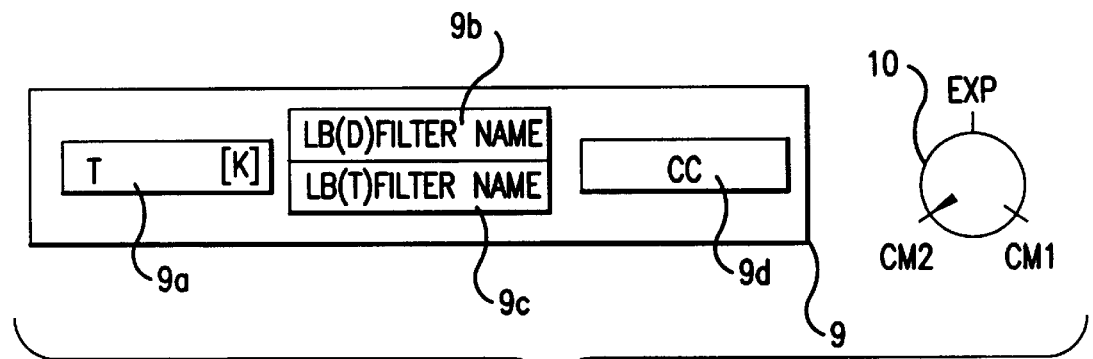
Figure 30C:
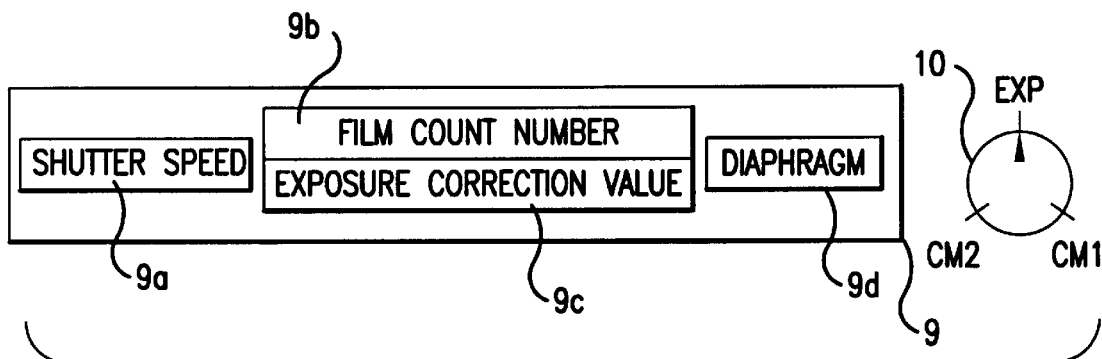

FIGS. 30(a)–30(c) show examples of display of the color information display 9 for each mode of the display interchange dial 12. When display interchange dial 12 is switched to the first mode (CM 1), color information display 9 simultaneously displays the color temperature T, the LB-value LB(D) for the day light type film, the LB-value LB(T) for the tungsten type film, and the CC-value CC, all of which are determined by CPU 13, at display portions 9a, 9b, 9c, 9d, respectively, which are explained in FIG. 29, as shown in FIG. 30(a). When display interchange dial 12 is switched to the second mode (CM 2), color information display 9 simultaneously displays the color temperature T, the LB filter name corresponding to the LB-value LB(D) for the day light type film, the LB filter name corresponding to the LB-value LB(T) for the tungsten type film, and the CC filter name ran corresponding to the CC-value CC at display portions 9a, 9b, 9c, 9d, respectively, which are explained above, as shown in FIG. 30(b). When display interchange dial 12 is switched to the third mode (EXP), color information display 9 simultaneously displays the shutter speed, the film count number, the exposure correction value and the diaphragm value at display portions 9a, 9b, 9c, 9d, which are explained above, as shown in FIG. 30(c) (the film count number is stored in a memory unit (not shown) and the exposure correction value is determined by CPU 13).

According to the invention, color information display 9 simultaneously displays the LB-values LB(D) and LB(T), respectively, corresponding to the day light type film and the tungsten type film, and correction color filters (LB filters) corresponding to the LB-values LB(D) and LB(T). Therefore, it is not necessary to provide a film interchange switch. Further, color information is obtained immediately, resulting in improved operability.

Also, the LB-values LB(D) and LB(T) respectively corresponding to the day light type film and the tungsten type film are simultaneously displayed on the existing display unit (color information display 9) without providing a film interchange switch, and operability is improved. The same can be said for the correction color filter names corresponding to LB-values LB(D) and LB(T).

Figure 31:
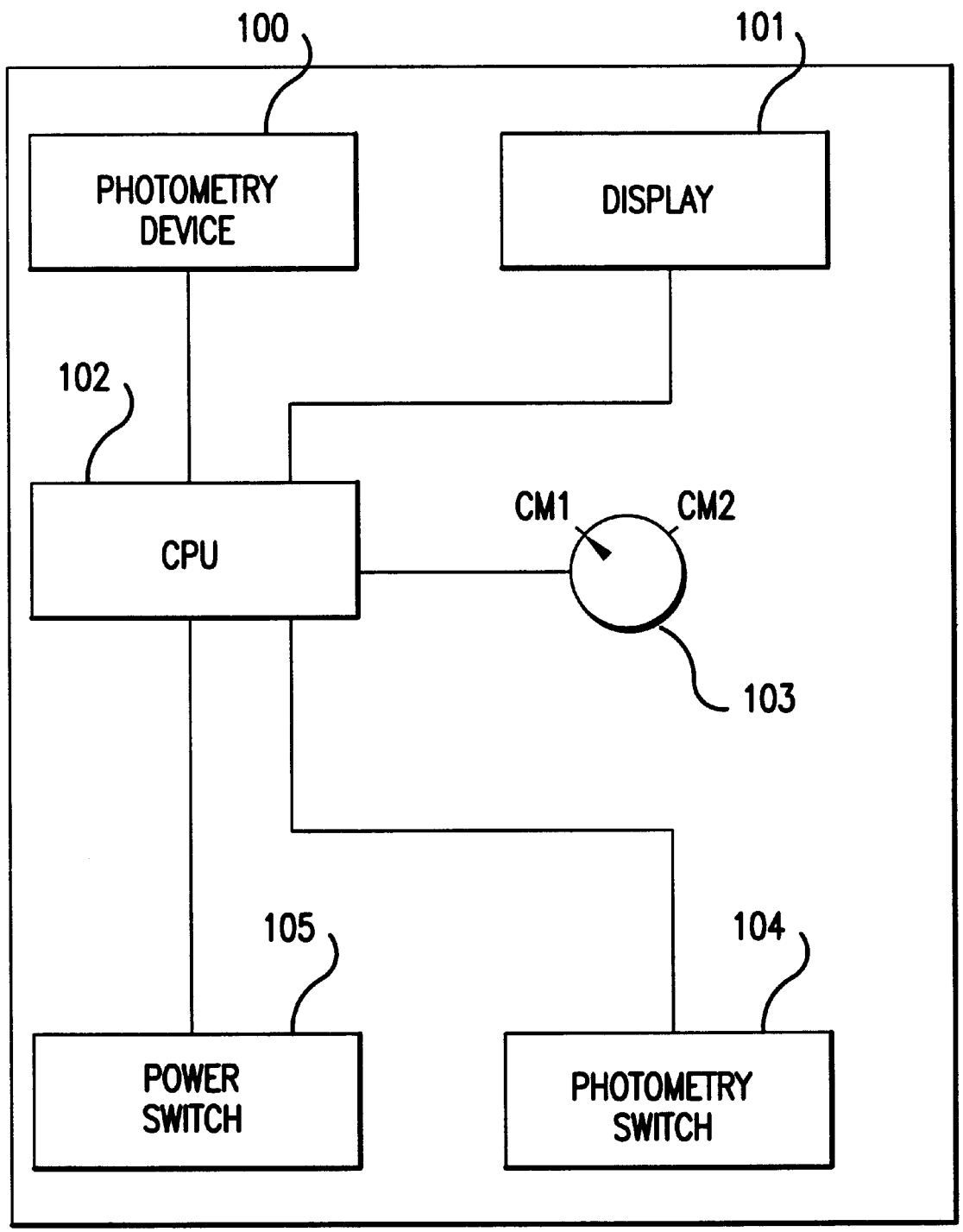
FIG. 31 is a block diagram of a colorimeter according to the third embodiment of the invention.

Next, a colorimeter in accordance with the invention will be described. FIG. 31 is a block diagram describing the structure of a colorimeter in accordance with the invention. In the colorimeter, power is supplied to each unit by turning ON power switch 105. A photometry switch 104 is operated during the color measurement of the object field. A photometry device 100 has a structure similar to photometry device 8 described in FIG. 25. The photometry device 100 measures light incident from the object field of each color component R, G and B, and outputs the results to CPU 102. A dispersion plate (not shown) is provided in photometry device 100 to illuminate incident light uniformly to each photosensor.

The CPU 102 controls the operation of each unit and executes routines to determine the color information (color temperature, LB-value, CC-value) using the photometry values input from photometry device 100. The display 101 displays the color information determined by CPU 102 in the following two modes. In the first mode (CM 1), display 101 simultaneously displays the color temperature, the LB-value LB(D) (for use with a day light type film), the LB-value LB(T) (for use with a tungsten type film), and the CC-value CC. In the second mode (CM 2), display 101 simultaneously displays the color temperature, the LB filter name corresponding to LB(D), the LB filter name corresponding to LB(T), and the CC filter name corresponding to CC-value CC. The display interchange dial 103 is operated to change the display mode of display 101 to either the first display mode (CM 1) or the second display mode (CM 2).

Figure 32:
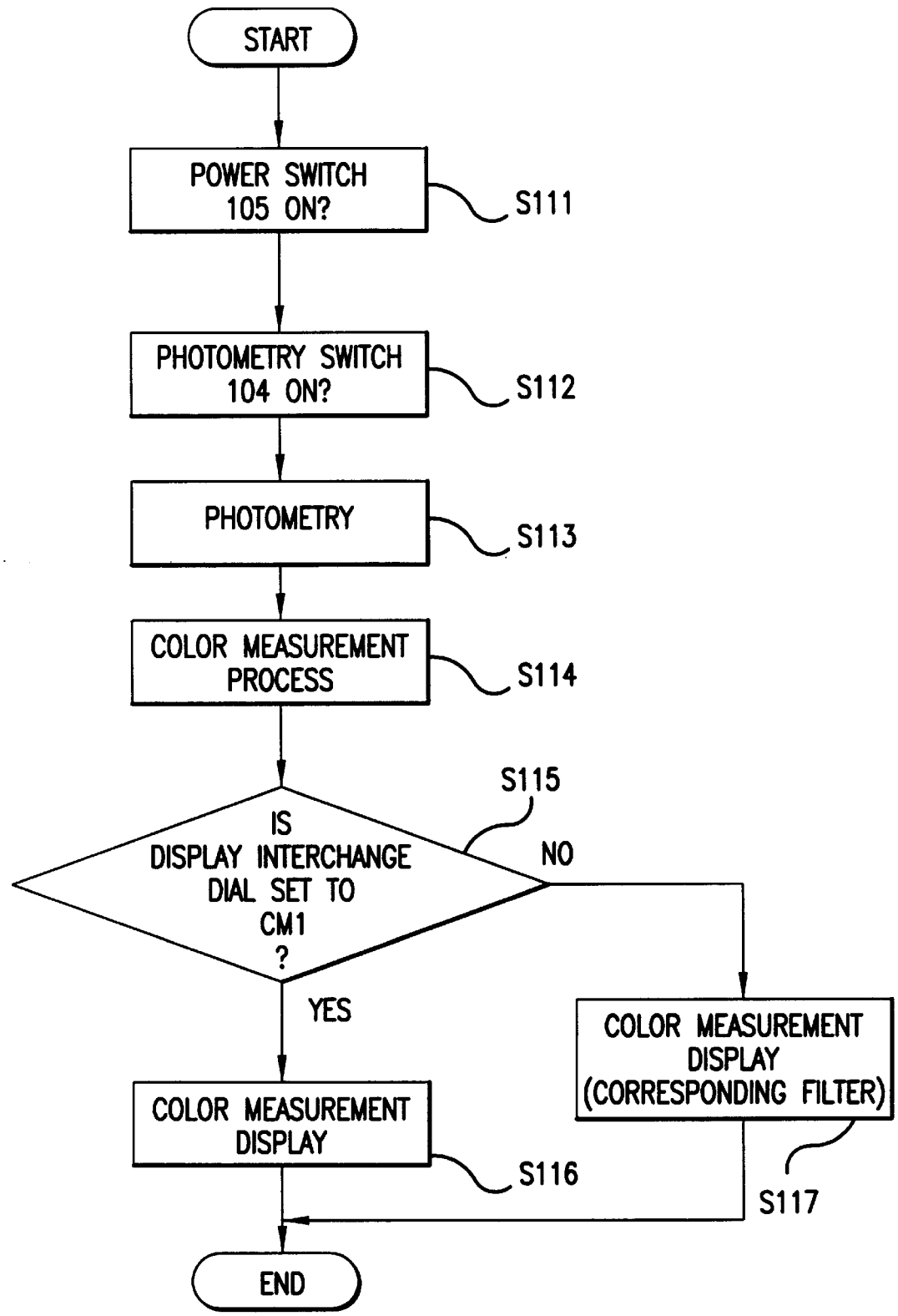
FIG. 32 is a flow chart that explains the operation of the colorimeter show n in FIG. 31.

The operation of the colorimeter shown in FIG. 31 is described hereafter with reference to the flow chart of FIG. 32. In step S111, after power switch 105 is switched ON, power is supplied to each unit of the colorimeter, and the program proceeds to step S112. In step S112, upon turning ON of photometry switch 104, photometry device 100 measures light entering from the object field and outputs sensor data for each color component R, G and B to CPU 102.

In step S114, CPU 102 executes the color measurement process described in FIGS. 27 and 28 based on the sensor data for each color component R, G and B, and then determines the color temperature T (kelvin), LB-value LB(D) for day light type film, LB-value LB(T) for the tungsten type film, and CC-value CC. The program then proceeds to step S115.

In step S115, CPU 102 determines whether display interchange dial 103 is switched to the first mode (CM 1). If CPU 13 determines that display interchange dial 103 is switched to the first mode, the program proceeds to step S116 and display 101 simultaneously displays the color temperature T, the LB-value LB(D) for day light type film, the LB-value LB(T) for tungsten type film, and the CC-value CC, after which the operation is completed.

On the other hand, if CPU 102 determines that display interchange dial 103 is not switched to the first mode (CM 1) (in other words the dial is switched to the second mode (CM 2)), the program proceeds to step S117 and display 101 simultaneously displays the color temperature T, the LB filter name corresponding to LB-value LB(D) for day light type film, the LB filter name corresponding to LB-value LB(T) for tungsten type film, and the CC filter name corresponding to the CC-value CC, after which the operation is completed.

With the invention, display 101 simultaneously displays the LB-values LB(D) and LB(T), respectively, corresponding to day light type film and the tungsten type film (also, the LB filter names corresponding to the LB-values LB(D) and LB(T)), using the existing display unit without providing a film interchange switch, resulting in improved operability.

As described above, the display apparatus of the camera and the colorimeter of the invention simultaneously displays a plurality of color information corresponding to different types of photosensitive materials, hence color information is obtained speedily and simply, and operability is improved.

The invention is not limited to camera and colorimeter apparatus that determine color information for day light type film and tungsten type film. It is possible to determine color information for other types of photosensitive image recording materials. Additionally, color information for more than two different types of photosensitive materials can be determined and simultaneously displayed.

In the illustrated embodiments, the controller is a CPU. The CPU can be part of a special purpose integrated circuit (e.g., ASIC) that controls the overall apparatus (camera, colorimeter, etc.) along with the elements detailed in the Figures, or it can be specifically dedicated to controlling only the elements detailed in the Figures. The controller also could be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flow charts shown in FIGS. 26–28 and 32 can be used as the controller.

While the invention had been described in conjunction with preferred embodiments thereof, it is evident that many alternatives, modifications and variations may be apparent to those skilled in the art. Accordingly, it is intended to embrace all alternatives, modifications and variations which may fall within the spirit and broad scope of the appended claims.

What is claimed is:

1. Apparatus, comprising:
    a photometry device that includes a photosensor that measures incident light from an object field to output photometry values representing a plurality of color components;
    a controller coupled to said photometry device, said controller determining a plurality of color information of the object field based on said photometry values, said plurality of color information including information relating to photographing the object field with an appropriate color balance for different types of photosensitive materials; and a display coupled to said controller, said display being capable of simultaneously displaying said plurality of color information.

2. The apparatus of claim 1, wherein the different types of photosensitive materials includes day light type film and tungsten type film.

3. A camera comprising:

a photometry device that includes a photosensor that measures incident light from an object field to output photometry values representing a plurality of color components;

a controller coupled to said photometry device, said controller determining a plurality of color information of the object field based on said photometry values, said plurality of color information including information relating to photographing the object field with an appropriate color balance for different types of photosensitive materials; and a display coupled to said controller, said display being capable of simultaneously displaying the plurality of color information.

4. The camera of claim 3, wherein the display is located in a body of said camera and is arranged so as to be observed through a viewfinder of said camera.

5. The camera of claim 3, wherein the different types of photosensitive materials are day light type film and tungsten type film.

6. The camera of claim 4, wherein said photometry device also measures an amount of light of the object field and said controller determines, from the result of said measurement, a shutter speed and a diaphragm value.

7. The camera of claim 6, further comprising a selection device that enables user selection between:

a first mode in which the display simultaneously displays the plurality of color information of the object field for the different types of photosensitive materials;

a second mode in which the display simultaneously displays a plurality of correction filter names corresponding to the plurality of color information of the object field for the different types of photosensitive materials; and a third mode in which the display simultaneously displays the shutter speed and the diaphragm value.

8. The camera of claim 7, wherein the display is located in a body of said camera and is arranged so as to be observed through a viewfinder of said camera.

9. The camera of claim 5, wherein the display is located in a body of said camera and is arranged so as to be observed through a viewfinder of said camera.

10. A colorimeter comprising:

a photometry device that includes a photosensor that measures incident light from an object field to output photometry values representing a plurality of color components;

a controller coupled to said photometry device, said controller determining a plurality of color information of the object field based on said photometry values, said plurality of color information including information relating to photographing the object field with an appropriate color balance for at least two different types of photosensitive materials; and a display coupled to said controller, said display being capable of simultaneously displaying the plurality of color information.

11. The colorimeter of claim 10, wherein the different types of photosensitive materials are day light type film and tungsten type film.

12. The colorimeter of claim 10, further comprising a selection device that enables user selection between:

a first mode in which the display simultaneously displays the plurality of color information of the object field for the different types of photosensitive materials; and a second mode in which the display simultaneously displays a plurality of correction filter names corresponding to the plurality of color information of the object field for the different types of photosensitive materials.

13. The colorimeter of claim 11, further comprising a selection device that enables user selection between:

a first mode in which the display simultaneously displays the plurality of color information of the object field for the different types of photosensitive materials; and a second mode in which the display simultaneously displays a plurality of correction filter names corresponding to the plurality of color information of the object field for the different types of photosensitive materials.

14. Apparatus, comprising:

photometry means for measuring incident light from an object field, said photometry means outputting photometry values representing a plurality of color components;

control means for determining a plurality of color information of the object field based on said photometry values, said plurality of color information including information relating to photographing the object field with an appropriate color balance for different types of photosensitive materials; and means for simultaneously displaying said plurality of color information.

15. The apparatus of claim 14, wherein said apparatus is a camera.

16. The apparatus of claim 14, wherein said apparatus is a colorimeter.

17. A method comprising the steps of:

measuring incident light from an object field to output photometry values representing a plurality of color components;

determining a plurality of color information of the object field based on said photometry values, said plurality of color information relating to photographing the object field with an appropriate color balance for different types of photosensitive materials; and simultaneously displaying said plurality of color information.

18. The method of claim 17, wherein the different types of photosensitive materials are day light type film and tungsten type film.

19. The method of claim 17, wherein said method is performed by a colorimeter.

20. The method of claim 17, wherein said method is performed by a camera.

21. The method of claim 20, wherein said camera further performs the steps of:

measuring an amount of light of the object field; and determining from said measurement, a shutter speed and a diaphragm value.

22. The method of claim 21, further comprising selectively displaying in a plurality of modes, including:

a first mode in which the plurality of color information of the object field for the different types of photosensitive materials is simultaneously displayed;

a second mode in which a plurality of correction filter names corresponding to the plurality of color information of the object field for the different types of photosensitive materials is simultaneously displayed; and a third mode in which the shutter speed and the diaphragm value are simultaneously displayed.

23. Apparatus, comprising:

a photometry device that includes a photosensor that measures incident light from an object field to output photometry values representing a plurality of color components;

a controller coupled to said photometry device, said controller determining a plurality of different kinds of color information of the object field based on said photometry values;

a display coupled to said controller, said display being capable of simultaneously displaying said plurality of different kinds of color information; and a selection device that enables user selection between a first display mode in which the display displays the plurality of different kinds of color information, and a second display mode in which the display displays filter names corresponding to the plurality of different kinds of color information.

24. Apparatus, comprising:

a photometry device that includes a photosensor that measures incident list from an object field to output photometry values representing a plurality of color components;

a controller coupled to said photometry device, said controller determining a plurality of different kinds of color information of the object field based on said photometry values;

a display coupled to said controller, said display being capable of simultaneously displaying said plurality of different kinds of color information; and a selection device that enables user selection between a first display mode in which the display displays the plurality of different kinds of color information; a second display mode in which the display displays filter names corresponding to the plurality of different kinds of color information; and a third display mode in which the display displays the shutter speed and the diaphragm value, wherein the photometry device also measures an amount of light from the object field and the controller determines, from the result of the measurement, a shutter speed and a diaphragm value.

* * * * *